US012322402B2

(12) United States Patent
Drolet

(10) Patent No.: US 12,322,402 B2
(45) Date of Patent: Jun. 3, 2025

(54) AI-GENERATED MUSIC DERIVATIVE WORKS

(71) Applicant: Daniel A Drolet, Charleston, SC (US)

(72) Inventor: Daniel A Drolet, Charleston, SC (US)

( * ) Notice: Subject to any disclaimer, the term of this patent is extended or adjusted under 35 U.S.C. 154(b) by 0 days.

(21) Appl. No.: 18/926,097

(22) Filed: Oct. 24, 2024

(65) Prior Publication Data

US 2025/0131928 A1 Apr. 24, 2025

Related U.S. Application Data

(60) Provisional application No. 63/592,741, filed on Oct. 24, 2023.

(51) Int. Cl.
*G10L 19/018* (2013.01)

(52) U.S. Cl.
CPC .................................. *G10L 19/018* (2013.01)

(58) Field of Classification Search
CPC ..................................................... G10L 19/018
See application file for complete search history.

(56) References Cited

U.S. PATENT DOCUMENTS 12,019,982 B2 6/2024 Pouran Ben Veyseh et al.
12,080,046 B2 9/2024 Saraee et al.
12,086,857 B2 9/2024 Kharbanda et al.
12,106,318 B1 10/2024 Chiang et al.
12,106,548 B1 10/2024 Brudalla et al.
12,118,325 B2 10/2024 Gray et al.
(Continued)

FOREIGN PATENT DOCUMENTS

AU 2004258523 A1 * 2/2006 ............. G06F 21/10
CA 2605641 A1 * 11/2006 ........... G06T 1/0071
(Continued)

OTHER PUBLICATIONS

Ramponi, Marco, "Recent developments in Generative AI for Audio", AssemblyAI, retrieved from the internet on Oct. 20, 2024, https://www.assemblyai.com/blog/recent-developments-in-generative-ai-for-audio/, 34 pages.
(Continued)

*Primary Examiner* — Mohammad K Islam

(57) ABSTRACT

Herein disclosed is receiving predetermined content, receiving a request to transform the predetermined content into a derivative work, receiving a requested theme for the derivative work, using generative artificial intelligence to create the derivative work generated as a function of the predetermined content and the requested theme, determining if the generated derivative work is approved based on a machine learning model configured to determine a content approval score as a function of content owner preferences, in response to determining the generated derivative work is approved, applying a digital watermark to the approved derivative work, configuring an authorization server to govern use of the approved derivative work based on the digital watermark and providing user access to the authorized derivative work. The requested theme may be determined using a Large Language Model (LLM) and a chatbot interview. The generative artificial intelligence may comprise a diffusion model. The content may comprise music.

28 Claims, 7 Drawing Sheets

(56) References Cited

U.S. PATENT DOCUMENTS

| | | | |
|---|---|---|---|
| 12,118,976 B1 | 10/2024 | Chen et al. | |
| 12,165,655 B1 * | 12/2024 | Sandrew | G10L 17/14 |
| 2006/0004669 A1 * | 1/2006 | Ito | G06Q 30/00 705/59 |
| 2006/0271494 A1 * | 11/2006 | Ito | G06F 21/10 705/59 |
| 2022/0092267 A1 | 3/2022 | Hou et al. | |
| 2023/0095092 A1 | 3/2023 | Xiao et al. | |
| 2023/0377099 A1 | 11/2023 | Kreis et al. | |
| 2023/0377214 A1 | 11/2023 | Kansy et al. | |
| 2024/0005604 A1 | 1/2024 | Kreis et al. | |
| 2024/0095987 A1 | 3/2024 | Piramutha et al. | |
| 2024/0152544 A1 | 5/2024 | Aykut et al. | |
| 2024/0185396 A1 | 6/2024 | Hatamizadeh et al. | |
| 2024/0253217 A1 | 8/2024 | Vahdat et al. | |
| 2024/0282079 A1 | 8/2024 | Saraee et al. | |
| 2024/0289407 A1 | 8/2024 | Rofouei et al. | |
| 2024/0304177 A1 | 9/2024 | Wu et al. | |
| 2024/0312087 A1 | 9/2024 | Agrawal et al. | |
| 2024/0346629 A1 | 10/2024 | Harikumar et al. | |

FOREIGN PATENT DOCUMENTS

| | | | | |
|---|---|---|---|---|
| CA | 2605646 A1 * | 11/2006 | G06T 1/0071 |
| CN | 1525363 A * | 9/2004 | G06F 21/10 |
| JP | 2004013493 A * | 1/2004 | G06F 21/10 |
| JP | 2004506947 A * | 3/2004 | G06F 21/10 |
| JP | 2004193843 A * | 7/2004 | G06F 21/10 |
| JP | 2006244075 A * | 9/2006 | G06F 21/10 |
| JP | 3990853 B2 * | 10/2007 | G06F 21/10 |
| JP | 4353651 B2 * | 10/2009 | G06F 21/10 |
| JP | 4456185 B2 * | 4/2010 | G06T 1/0085 |
| KR | 100865247 B1 * | 10/2008 | G10L 19/018 |
| WO | WO-2024097380 A1 * | 5/2024 | G06F 16/685 |
| WO | WO-2024158853 A1 * | 8/2024 | G06N 3/045 |
| WO | WO-2024220450 A1 * | 10/2024 | G06F 3/012 |
| WO | WO-2024243183 A2 * | 11/2024 | G06F 3/012 |

OTHER PUBLICATIONS

Weng, Lilian, “What are Diffusion Models?”, GitHub, Jul. 11, 2021, https://liliamweng.github.io/posts/2021-07-11-diffusion-models/#reverse-diffusion-process, 25 pages.

O’Connor, Ryan, “Automatic summarization with LLMs in Python”, AssemblyAI, retrieved from the internet on Oct. 20, 2024, https://www.assemblyai.com/blog/automatic-summarization-llms-python/, 12 pages.

“Apply LLMs to audio files, Learn how to leverage LLMs for speech using LeMUR”, AssemblyAI, retrieved from the internet on Oct. 20, 2024, https://www.assemblyai.com/docs/getting-started/apply-llm-to-audio-files, 5 pages.

“Building In-Video Search”, Netflix Technology Blog, Nov. 6, 2023, 12 pages.

Stevens, Ingrid, “Chat with Your Audio Locally: A guide to RAG with Whisper, Ollama, and FAISS”, Medium, Nov. 19, 2023, https://medium.com/@ingridstevens/chat-with-your-audio-locally-a-guide-to-rag-with-whisper-ollama-and-faiss-6656b040a68, 9 pages.

Anderson, Brian, “Reverse-Time Diffusion Equation Models”, Stochastic Processes and their Applications 12 (1982) 313-326, North-Holland Publishing Company, 14 pages.

“Content Moderation”, AssemblyAI, retrieved from the internet on Oct. 20, 2024, https://www.assembyai.com/docs/audio-intelligence/content-moderation, 11 pages.

Muthukumar, “Detecting Voiced, Unvoiced and Silent parts of a speech signal”, Medium, Mar. 19, 2024, https://muthuku37.medium.com/detecting-voiced-unvoiced-and-silent-parts-of-a-speech-signal-74e6fbf5e75, 26 pages.

“Diffusion Models: A Comprehensive High-Level Understanding”, Research Graph, Medium, May 21, 2024, https://medium.com/@researchgraph/diffusion-model-compreshensive-high-level-understanding-55d6ecad2cba, 22 pages.

Larcher, Mario, “Diffusion Transformer Explained”, Towards Data Science, Feb. 28, 2024, https://medium.com/towards-data-sciene/diffusion-transforer-explained-e603c4770f7e, 19 pages.

O’Connor, Ryan, “Introduction to Diffusion Models for Machine Learning” AssemblyAI, May 12, 2022, https://www.assemblyai.com/blog/diffusion-models-for-machine-learning-introduction/, 34 pages.

Andreas, et al., “DRCap_Zeroshot_Audio-Captioning”, GitHub, retrieved from the internet on Oct. 20, 2024, https://github.com/X-LANCE/SLAM-LLM/blob/main/examples/drcap_zeroshot_aac/README.md, 3 pages.

Di Pietro, Mauro, “GenAI with Python: Build Agents from Scratch (Complete Tutorial)”, Towards Data Science, Sep. 29, 2024, https://towardsdatascience.com/genai-with-python-build-agents-from-scratch-complete-tutorial-4fc1e0814e2ec, 31 pages.

Ramesh, et al., “Hierarchical Text-Conditional Image Generation with CLIP Latents”, Cornell Univ., arXiv:2204.06125v1 [cs.CV], Apr. 13, 2022, 27 pages.

Ramírez, et al., “Voice Activity Detection. Fundamentals and Speech Recognition System Robustness.” InTech Open Science Open Minds, 2007, 24 pages.

Swimberghe, Niels, “How to integrate spoken audio into LangChain.js using AssemblyAI”, AssemblyAI, Aug. 15, 2023, https://www.assemblyai.com/blog/integrate-audio-langchainjs/, 12 pages.

“A Fairytaler that Fakes Fluent and Faithful Speech with Flow Matching”, F5-TTS, retrieved from the internet on Oct. 20, 2024, https:/swivid.github.io.F5-TTS/, 17 pages.

“CLIP: Connecting text and images”, OpenAI, Jan. 5, 2021, https://openai.com/index/clip/, 16 pages.

“CLIP”, Hugging Face, retrieved from the internet on Oct. 22, 2024, https://huggingface.co/docs/transformers/model_doc/clip, 49 pages.

Rustamy, Fahim, Phd., “CLIP Model and The Importance of Multimodal Embeddings”, Towards Data Science, Dec. 11, 2023, https://towardsdatascience.com/clip-model-and-the-importance-of-multimodal-embeddings-1c8f6b13bf72, 20 pages.

“Diffusion Models from Scratch”, Hugging Face Diffusion Course, retrieved from the internet on Oct. 22, 2024, https://huggingface.co/learn/diffusion-course/en/unit1/3, 31 pages.

“MC_MusicCaps”, GitHub, retrieved from the internet on Oct. 20, 2024, https://github.com/L-LANCES/SLAM-LLM/blob/main/examples/mc_musiccaps/README.md, 2 pages.

Briggs, James, “Quick-fire Guide to Multi-Modal ML With OpenAI’s CLIP”, Towards Data Science, Aug. 11, 2022, https://towardsdatascience.com/quick-fire-guide-to-multi-modal-ml-with-openais-clip-2dad7e398ac0, 21 pages.

Bouchard, Louis-Francois, “Stable Diffusion for Videos Explained”, Towards AI, Nov. 29, 2023, https://pub.towardsai.net/stable-diffusion-for-videos-explained-fawf0b6af3b0, 15 pages.

Erdem, Kemal, “Step by Step visual introduction to Diffusion Models”, published Nov. 1, 2023, https://erdem.pl/2023/11/step-by-step-visual-introduction-to-diffusion-models, 15 pages.

“Stable Diffusion: Training Your Own Model in 3 Simple Steps”, run:ai, https://www.run.ai.guides/generative-ai/stable-diffusion-training, 10 pages.

Stevens, Ingrid, “Uncovering Insights in Audio: An Exploration”, GitHub, retrieved from the internet on Oct. 20, 2024, https://github.com/ingridstevens/whisper-audio-transcriber/tree/main, 6 pages.

Palucha, Szymon, “Understanding OpenAI’s CLIP model”, Medium, Feb. 24, 2024, https://medium.com/@paluchasz/understanding-openais-clip-model-6b52bade3fa3, 23 pages.

Chen et al., JEN-1 DreamStyler: Customized Musical Concept Learning via Pivotal Parameters Tuning, Cornell Univ., arXiv:2406.12292 [cs.SD], Jun. 18, 2024, 13 pages.

Github, “SLAM-AAC”, retrieved from the internet on Oct. 20, 2024, https://github.com/X-LANCE/SLAM-LLM, 5 pages.

Github, “SLAM-LLM”, retrieved from the internet on Oct. 20, 2024, https://github.com/X-LANCE/SLAM-LLM, 4 pages.

Huggingface.co Blog, “The Annotated Diffusion Model”, retrieved from the internet on Oct. 20, 2024, https://huggingface.co/blog/annotated-diffusion, 38 pages.

Huggingface.co Blog, “Train a Diffusion Model”, retrieved from the internet on Oct. 20, 2024, https://huggingface.co/docs/diffusers/tutorials/basic_training, 12 pages.

(56) References Cited

OTHER PUBLICATIONS

IBM, "What are Diffusion Models?", retrieved from the internet on Oct. 22, 2024, 18 pages.
Lil 'Log, "What are Diffusion Models?", retrieved from the internet on Oct. 22, 2024, 25 pages.
Assembly AI, "Topic Detection", retrieved from the internet on Oct. 20, 2024, https://www.assemblyai.com/docs/audio-intelligence/topic-detection, 6 pages.
Assembly AI, "Key Phrases", retrieved from the internet on Oct. 20, 2024, https://www.assemblyai.com/docs/audio-intelligence/key-phrases, 5 pages.
Assembly AII, "Sentiment Analysis", retrieved from the internet Oct. 20, 2024, https://www.assemblyai.com/docs/audio-intelligence/sentiment-analysis, 4 pages.
Assembly AI, "Summarization", retrieved from the internet on Oct. 20, 2024, https://assemblyai.com/docs/audio-intelligence/summarization, 6 pages.
Chen et al., "Buildin In-Video Search", Medium, Nov. 6, 2023, https://netflixtechblog.com/building-in-video-search-936766f0017c, 12 pages.
Atal et al., "A pattern recognition approach to voiced-unvoiced-silence classification with applications to speech recognition", IEEE Transactions on Acoustics, Speech, and Signal Processing (vol. 24, Issue: 3, Jun. 1976), 12 pgs.
Kingma et al., "Auto-Encoding Variational Bayes", Cornell Univ., arXiv:1312.6114v11 [stat.ML] - , Dec. 10, 2022, 14 pgs.
Sohl-Dickstein et al., "Deep Unsupervised Learning using Nonequilibrium Thermodynamics" Cornell Univ., arXiv:1503.03585v8 [cs.LG], Nov. 18, 2015. 18 pgs.
Ronneberger et al., "U-Net: Convolutional Networks for Biomedical Image Segmentation", Cornell Univ., arXiv:1505.04597v1 [cs.CV], May 18, 2015, 8 pgs.
Ho et al., "Denoising Diffusion Probabilistic Models", Cornell Univ., arXiv:2006.11239v2 [cs.LG], Dec. 16, 2020, 25 pgs.
Radford et al., "Learning Transferable Visual Models From Natural Language Supervision", Cornell Univ., arXiv:2103.00020v1 [cs.CV], Feb. 26, 2021, 48 pgs.
Dhariwal et al., "Diffusion Models Beat GANs on Image Synthesis", Cornell Univ., arXiv:2105.05233v4 [cs.LG], Jun. 1, 2021, 44 pgs.
Rombach et al., "High-Resolution Image Synthesis with Latent Diffusion Models", Cornell Univ., arXiv:2112.10752v2 [cs.CV], Apr. 13, 2022, 45 pgs.
Blattmann et al., "Semi-Parametric Neural Image Synthesis", Cornell Univ., arXiv:2204.11824v3 [cs.CV], Oct. 24, 2022, 34 pgs.
Karras et al., "Elucidating the Design Space of Diffusion-Based Generative Models", Cornell Univ., arXiv:2206.00364v2 [cs.CV], Oct. 11, 2022, 47 pgs.
Graikos et al., "Diffusion models as plug-and-play priors" Cornell Univ., arXiv:2206.09012v3 [cs.LG], Jan. 8, 2023, 22 pgs.
Luo, "Understanding Diffusion Models: A Unified Perspective", Cornell Univ., arXiv:2208.11970v1 [cs.LG], Aug. 25, 2022, 23 pgs.
Ruiz et al., "DreamBooth: Fine Tuning Text-to-Image Diffusion Models for Subject-Driven Generation", Cornell Univ., arXiv:2208.12242v2 [cs.CV], Mar. 15, 2023, 25 pgs.
Yang et al., "Diffusion Models: A Comprehensive Survey of Methods and Applications", Cornell Univ., arXiv:2209.00796v9 [cs.LG], Oct. 24, 2022, 39 pgs.
Yang et al., "Diffusion Models: A Comprehensive Survey of Methods and Applications", Cornell Univ., arXiv:2209.00796v13 [cs.LG], Oct. 24, 2022, 39 pgs.
Lipman et al., "Flow Matching for Generative Modeling", Cornell Univ., arXiv:2210.02747v2 [cs.LG], Feb. 8, 2023, 28 pgs.
Peebles et al., "Scalable Diffusion Models with Transformers", Cornell Univ., arXiv:2212.09748v2 [cs.CV], Mar. 2, 2023, 25 pgs.
Schneider et al., "Moûsai: Text-to-Music Generation with Long-Context Latent Diffusion", Cornell Univ., arXiv:2301.11757v2 [cs.CL], Jan. 30, 2023, 13 pgs.
Fei, et al., "Generative Diffusion Prior for Unified Image Restoration and Enhancement", Cornell Univ., arXiv:2304.01247v1 [cs.CV], Apr. 3, 2023, 46 pages.
Ghosal, et al., "Text-to-Audio Generation using Instruction-Tuned LLM and Latent Diffusion Model", Cornell Univ., arXiv:2304.13731v2 [eess.AS], May 29, 2023, 15 pages.
Liu, et al., AudioLDM: Text-to-Audio Generation with Latent Diffusion Models, Cornell Univ., arXiv:2301.12503v3 [cs.SD], Sep. 9, 2023, 25 pages.
Wei, et al., "ELITE: Encoding Visual Concepts into Textual Embeddings for Customized Text-to-Image Generation", Cornell Univ., arXiv:2302.13848v2 [cs.CV], Aug. 18, 2023, 16 pages.
Zhang, et al., "A Survey on Audio Diffusion Models: Text to Speech Synthesis and Enhancement in Generative AI", Cornell Univ., arXiv:2303.13336v2 [cs.SD], Apr. 2, 2023, 18 pages.
Nikkiran, et al., "Step-by-Step Diffusion: An Elementary Tutorial", Cornell Univ., arXiv:2406.08929v2 [cs.LG], Jun. 23, 2024, 51 pages.
Copet, et al., "Simple and Controllable Music Generation", Cornell Univ., arXiv:2306.05284v3 [cs.SD], Jan. 30, 2024, 17 pages.
Li, et al., "JEN-1: Text-Guided Universal Music Generation with Omnidirectional Diffusion Models", Cornell Univ., arXiv:2308.04729v1 [cs.SD], Aug. 9, 2023, 12 pages.
Yao, et al., "JEN-1 Composer: A Unified Framework for High-Fidelity Multi-Track Music Generation", Cornell Univ., arXiv:2310.19180v2 [cs.SD], Nov. 3, 2023, 12 pages.
Xue, et al., "Auffusion: Leveraging the Power of Diffusion and Large Language Models for Text-to-Audio Generation", Cornell Univ., arXiv:2401.01044v1 [cs.SD], Jan. 2, 2024, 17 pages.
Zheng, et al., "BAT: Learning to Reason about Spatial Sounds with Large Language Models", Cornell Univ., arXiv:2402.01591v2 [eess.AS], May 25, 2024, 16 pages.
Sammani, et al., "Interpreting and Analyzing CLIP's Zero-Shot Image Classification via Mutual Knowledge", Cornell Univ., arXiv:2410.13016v2 [cs.CV], Oct. 20, 2024, 28 pages.
Sammani, et al., "Interpreting and Analyzing CLIP's Zero-Shot Image Classification via Mutual Knowledge", Cornell Univ., arXiv:2410.13016v1 [cs.CV], Oct. 16, 2024, 28 pages.
Chen, et al., "F5-TTS: A Fairytaler that Fakes Fluent and Faithful Speech with Flow Matching", Cornell Univ., arXiv:2410.06885v2 [eess.AS], Oct. 15, 2024, 18 pages.
Chen, et al., "Contrastive Localized Language-Image Pre-Training", Cornell Univ., arXiv:2410.02746v1 [cs.CV], Oct. 3, 2024, 20 pages.
Xin, et al., "DiffATR: Diffusion-based Generative Modeling for Audio-Text Retrieval", Cornell Univ., arXiv:2409.10025v2 [cs.SD], Oct. 17, 2024, 5 pages.
Chen, et al., "JEN-1 DreamStyler: Customized Musical Concept Learning via Pivotal Parameters Tuning", Cornell Univ., arXiv:2406.12292v1 [cs.SD], Jun. 28, 2024, 13 pages.
Chan, Stanley, H., "Tutorial on Diffusion Models for Imaging and Vision", Cornell Univ., arXiv:2403.18103v2 [cs.LG], Sep. 6, 2024, 89 pages.
Tu, et al., "A Closer Look at the Robustness of Contrastive Language-Image Pre-Training (CLIP)", Cornell Univ., arXiv:2402.07410v1 [cs.CV], Feb. 12, 2024, 14 pages.
Esser, et al., "Scaling Rectified Flow Transformers for High-Resolution Image Synthesis", Cornell Univ., arXiv:2403.03206v1 [cs.CV], Mar. 5, 2024, 28 pages.
Bansal, et al., "Universal Guidance for Diffusion Models", Cornell Univ., arXiv:2302.07121v1 [cs.CV], Feb. 14, 2023, 10 pages.
Young, Mike, "A Complete Guide to Turning Text into Audio with Audio-LDM", retrieved from the internet on Oct. 20, 2024, https://notes.airmodels.fyi/audio-ldm-ai-text-to-audio-generation-with-latent-diffusion-models/, 9 pages.
"Lecture 14: LPC speech synthesis and autocorrelation-based pitch tracking", ECE 417, Multimedia Signal Processing, Oct. 10, 2019, 37 pages.
Ribeiro, Andre, "Linking Images and Text with OpenAI CLIP", Tawards Data Scoemce.retrieved from the internet on Oct. 22, 2024, https://towardsdatascience.com/linking-images-and-text-wth-openai-clip-abb4bdf5dbd2, 23 pages.

(56) References Cited

OTHER PUBLICATIONS

Copet, Jade, "MusicGen:Simple and Controllable Music Generation", GitHub, retrieved from the internet on Oct. 20, 2024, https://github.com/facebookresearch/audiocraft/blob/main/docs/MUSICGEN.md, 10 pages.

Agostinelli, et al., "MusicLM: Generating Music From Text", Cornell Univ., arXiv:2301.11325v1 [cs.SD], Jan. 26, 2023, 15 pages.

Microsoft Copilot: Your AI Companion, retrieved from the internet on Oct. 23, 2024, https://copilot.microsoft.com/?FORM=hpcodx&showconv=1, 3 pages.

Graf et al., "Features for voice activity detection: a comparative analysis", EURASIP Journal on Advances in Signal Processing, a SpringerOpen Journal, 2015, 15 pages.

"SELD_SpatialSoundQA", GitHub, retrieved from the internet on Oct. 20, 2024, https://github.com/X-LANCE/SLAM-LLM/blob/main/examples/seld_spatialsoundqa/README.md, 4 pages.

Radford, et al., "Contrastive Language-Image Pretraining", CLIP Explained, Papers With Code, retrieved from the internet on Oct. 22, 2024, https://paperswithcode.com/method/clip, 5 pages.

Huang, et al., "Make-An-Audio: Text-To-Audio Generation with Prompt-Enhanced Diffusion Models", Cornell Univ., arXiv:2301.12661v1 [cs.SD], Jan. 30, 2023, 16 pages.

Aguilera, Frank Morales, "Open AI Clip: Bridging Text and Images", The Deep Hub, https://medium.com/thedeephub/openai-clip-bridging-text-and-images-aaf3cd20299e, Apr. 11, 2024, 15 pages.

Atal, Bishnu S.; and Rabiner, Lawrence R.; "A Pattern Recognition Approach to Voiced-Unvoiced-Silence Classification with Applications to Speech Recognition" IEEE Transactions on Acoustics, Speech, and Signal Processing, vol. ASSP-24, No. 3, pp. 201-212; Jun. 1976.

* cited by examiner

AI-GENERATED MUSIC DERIVATIVE WORKS

CROSS-REFERENCE TO RELATED APPLICATIONS

This application claims the benefit of U.S. Provisional Application No. 63/592,741, titled "AI-GENERATED MUSIC DERIVATIVE WORKS," filed on Oct. 24, 2023, and this application incorporates the entire contents of the above-referenced application herein by reference.

TECHNICAL FIELD

This disclosure relates generally to content transformation and management using artificial intelligence (AI) and machine learning (ML) technologies.

BACKGROUND

Derivative works are creations that are based on one or more predetermined works. In the case of AI-generated music, derivative works may be created by using AI algorithms to analyze and learn from content such as copyrighted music, and then generate new music or other content based on the learned patterns and structures. Such a technique may infringe on the rights of the creator or copyright holder of the predetermined work, through reproduction and transformation without permission. A derivative work may be adverse to preferences of the creator or copyright holder of the predetermined work.

SUMMARY

Herein disclosed is receiving predetermined content, receiving a request to transform the predetermined content into a derivative work, receiving a requested theme for the derivative work, using generative artificial intelligence to create the derivative work generated as a function of the predetermined content and the requested theme, determining if the generated derivative work is approved based on a machine learning model configured to determine a content approval score as a function of content owner preferences, in response to determining the generated derivative work is approved, applying a digital watermark to the approved derivative work, configuring an authorization server to govern use of the approved derivative work based on the digital watermark and providing user access to the authorized derivative work. The requested theme may be determined using a Large Language Model (LLM) and a chatbot interview. The generative artificial intelligence may comprise a diffusion model. The content may comprise music.

The details of various aspects are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
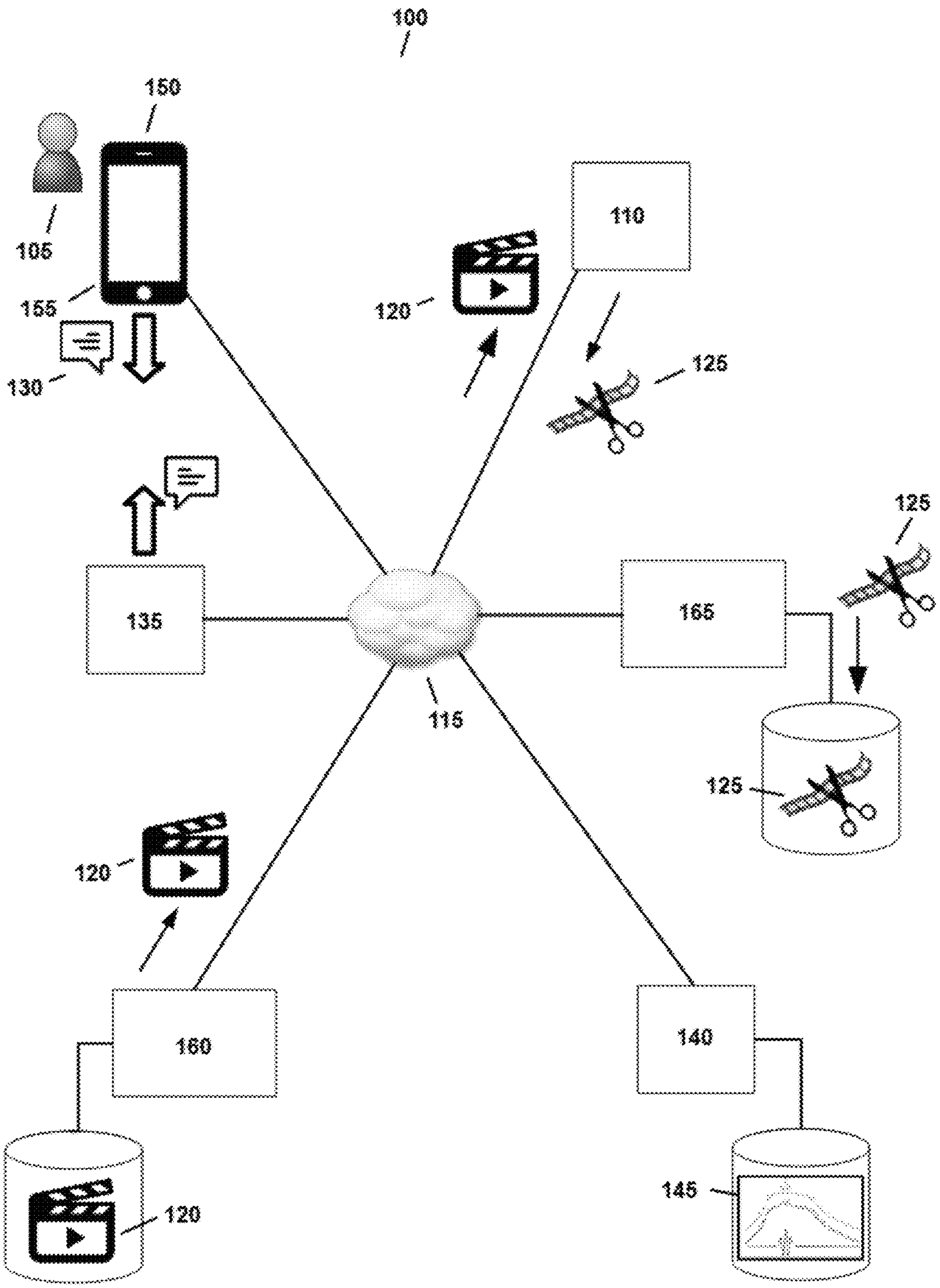
FIG. 1 depicts an illustrative operational scenario wherein users employ an exemplary content derivation platform to receive predetermined content, receive a request to transform the predetermined content into a derivative work, receive a requested theme for the derivative work, create the derivative work generated as a function of the predetermined content and the requested theme using generative artificial intelligence, determine if the generated derivative work is approved based on a content approval machine learning model configured to determine a content approval score as a function of a content owner preference and the generated derivative work and in response to determining the content approval score is greater than a predetermined minimum apply a digital watermark to the approved derivative work, configure an authorization server to govern use of the approved derivative work based on the digital watermark, and provide access to the approved derivative work.

FIG. 1 depicts an illustrative operational scenario wherein users employ an exemplary content derivation platform to receive predetermined content, receive a request to transform the predetermined content into a derivative work, receive a requested theme for the derivative work, create the derivative work generated as a function of the predetermined content and the requested theme using generative artificial intelligence, determine if the generated derivative work is approved based on a content approval machine learning model configured to determine a content approval score as a function of a content owner preference and the generated derivative work and in response to determining the content approval score is greater than a predetermined minimum apply a digital watermark to the approved derivative work, configure an authorization server to govern use of the approved derivative work based on the digital watermark, and provide access to the approved derivative work. In the exemplary scenario 100 depicted by FIG. 1, the user 105 directs the content derivation platform 110 via the network cloud 115 to transform the predetermined content 120 into a derivative work 125. In the depicted implementation, the derivative work 125 is determined as a function of a user-specific requested theme 130 received from the user 105 as text input to the prompt system 135. In the depicted implementation, the prompt system 135 includes a chatbot configured to interview the user 105 with questions directed to obtaining the requested theme 130. In the depicted implementation, the content derivation platform 110 creates the derivative work 125 using generative artificial intelligence, based on the predetermined content 120 and the requested theme 130. In the depicted implementation, the content derivation platform 110 determines if the generated derivative work 125 should be approved for use by the user 105, based on a content approval machine learning model configured to determine a content approval score as a function of a content owner preference and the generated derivative work 125. In response to determining the content approval score is greater than a predetermined minimum, the content derivation platform 110 configures the authorization server 140 to govern use of the approved derivative work 125 based on applying the digital watermark 145 to the derivative work 125. The authorization server 140 may provide access to the approved derivative work 125, based on monitoring use of the derivative work 125 to determine the presence of the watermark 145 in the derivative work 125. In the depicted implementation, the user 105 may direct the content derivation platform 110 using the mobile application 150 hosted by the mobile device 155. The mobile application 150 may be configured to cause the content derivation platform 110 to create the derivative work 125 using predetermined content 120 from the predetermined content server 160, based on the requested theme 130. In the depicted implementation, access to an approved derivative work 125 may be controlled by the authorization server 140 using the derivative work server 165. The derivative work server 165 may store approved derivative works 125 containing time-sensitive watermarks 145. For example, once approved, a derivative work may be repeatedly updated with a new watermark 145 that is only valid for a limited period of time. In some cases, the authorization server 140 may be configured to revoke, or not renew, approval for a derivative work 125, based on allowing the watermark 145 embedded in a derivative work 125 to expire.

Figure 2:
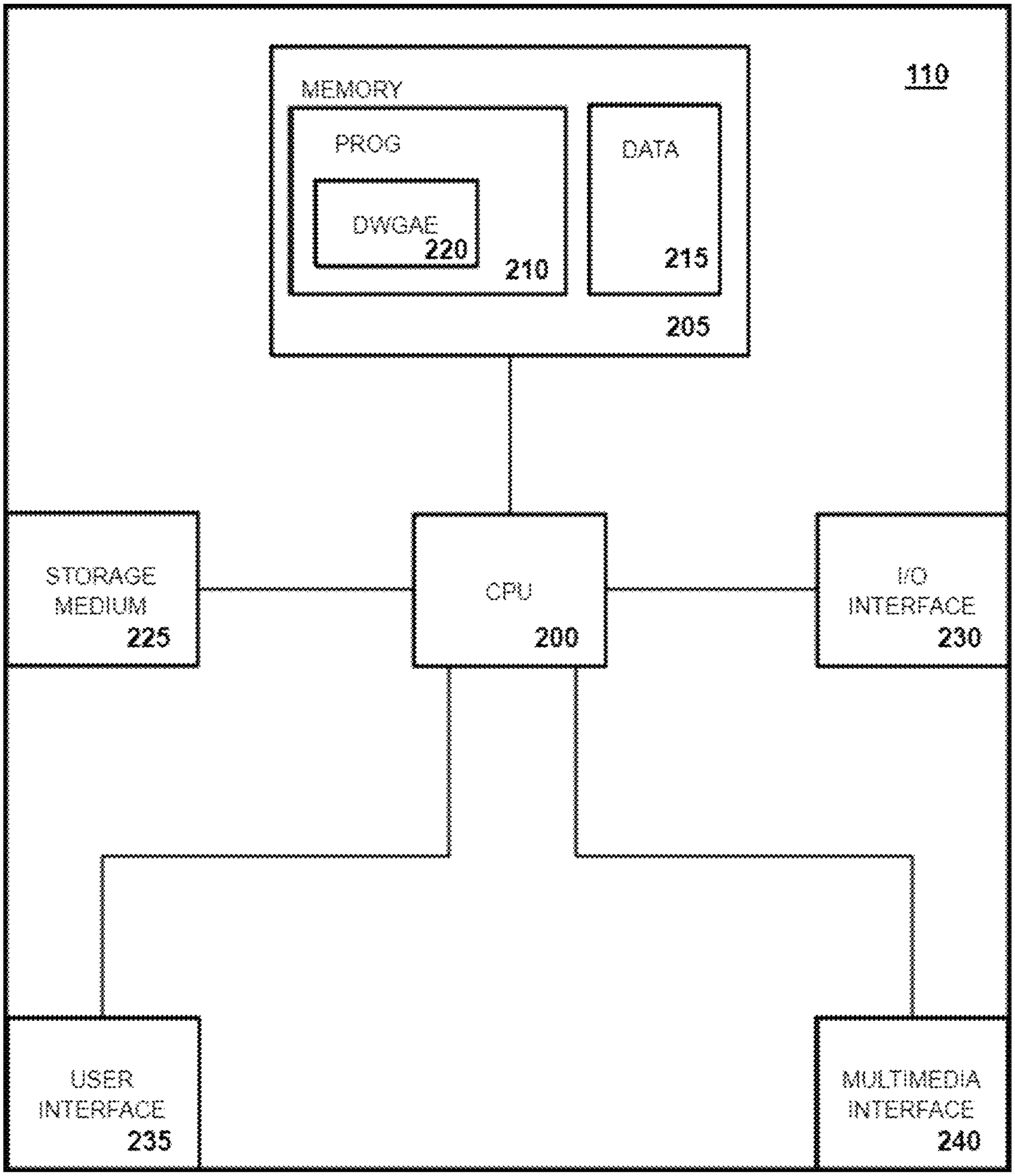
FIG. 2 depicts a schematic view of an exemplary content derivation platform designed to receive predetermined content, receive a request to transform the predetermined content into a derivative work, receive a requested theme for the derivative work, create the derivative work generated as a function of the predetermined content and the requested theme using generative artificial intelligence, determine if the generated derivative work is approved based on a content approval machine learning model configured to determine a content approval score as a function of a content owner preference and the generated derivative work and in response to determining the content approval score is greater than a predetermined minimum apply a digital watermark to the approved derivative work, configure an authorization server to govern use of the approved derivative work based on the digital watermark, and provide access to the approved derivative work.

FIG. 2 depicts a schematic view of an exemplary content derivation platform designed to receive predetermined content, receive a request to transform the predetermined content into a derivative work, receive a requested theme for the derivative work, create the derivative work generated as a function of the predetermined content and the requested theme using generative artificial intelligence, determine if the generated derivative work is approved based on a content approval machine learning model configured to determine a content approval score as a function of a content owner preference and the generated derivative work and in response to determining the content approval score is greater than a predetermined minimum apply a digital watermark to the approved derivative work, configure an authorization server to govern use of the approved derivative work based on the digital watermark, and provide access to the approved derivative work.

In FIG. 2, the schematic block diagram of the exemplary content derivation platform 110 includes processor 200 and memory 205. In the depicted implementation, the processor 200 is in electrical communication with the memory 205. The depicted memory 205 includes program memory 210 and data memory 215. The depicted program memory 210 stores encoded processor-executable program instructions implementing the derivative work generation and augmentation engine (DWGAE) 220. The illustrated program memory 210 may store other encoded processor-executable program instructions accessible to the processor 200. The processor-executable program instructions may include processor-executable program instructions configured to implement an OS (Operating System). The OS may include processor-executable program instructions configured to implement various operations when executed by the processor 200. The OS may be omitted. The illustrated program memory 210 may store encoded processor-executable program instructions configured to implement various Application Software. The Application Software may include processor-executable program instructions configured to implement various operations when executed by the processor 200. The Application Software may be omitted. In the depicted implementation, the processor 200 is communicatively and operably coupled with the storage medium 225. In the depicted implementation, the processor 200 is communicatively and operably coupled with the input/output (I/O) interface 230. In the depicted implementation, the I/O interface 230 includes a network interface. The network interface may be a wireless network interface. The network interface may be a Wi-Fi® interface. The network interface may be a Bluetooth® interface. The exemplary content derivation platform 110 may include more than one network interface. The network interface may be a wireline interface. The network interface may be omitted. In the depicted implementation, the processor 200 is communicatively and operably coupled with the user interface 235. In the depicted implementation, the processor 200 is communicatively and operably coupled with the multimedia interface 240. In the illustrated implementation, the multimedia interface 240 includes interfaces adapted to input and output of audio, video, and image data. The multimedia interface 240 may include one or more still image camera or video camera. Useful examples of the illustrated exemplary content derivation platform 110 include, but are not limited to, personal computers, servers, tablet PCs, smartphones, or other computing devices. Multiple exemplary content derivation platform 110 devices may be operably linked to form a computer network in a manner as to distribute and share one or more resources, such as clustered computing devices and server banks/farms. Various arrangements of such general-purpose multi-unit computer networks suitable for implementations of the disclosure, their typical configuration, and standardized communication links are well known to one skilled in the art. An exemplary content derivation platform 110 design may be realized in a distributed implementation. Some content derivation platform 110 designs may be partitioned between a client device, such as, for example, a phone, and a more powerful server system. A content derivation platform 110 partition hosted on a PC or mobile device may choose to delegate some parts of computation, such as, for example, machine learning or deep learning, to a host server. A client device partition may delegate computation-intensive tasks to a host server to take advantage of a more powerful processor, increased communication bandwidth or to offload excess work. Some content derivation platform 110 devices may be configured with a mobile chip including an engine adapted to implement specialized processing, such as, for example, neural networks, machine learning, artificial intelligence, image recognition, audio processing, or digital signal processing. Such an engine adapted to specialized processing may have sufficient processing power to implement some content derivation platform 110 features. However, an exemplary content derivation platform 110 may be configured to operate on a device with less processing power, such as, for example, various gaming consoles, which may not have sufficient processor power, or a suitable CPU architecture, to adequately support content derivation platform 110. Various implementations configured to operate on a such a device with reduced processor power may work in conjunction with a more powerful server system.

Figure 3:
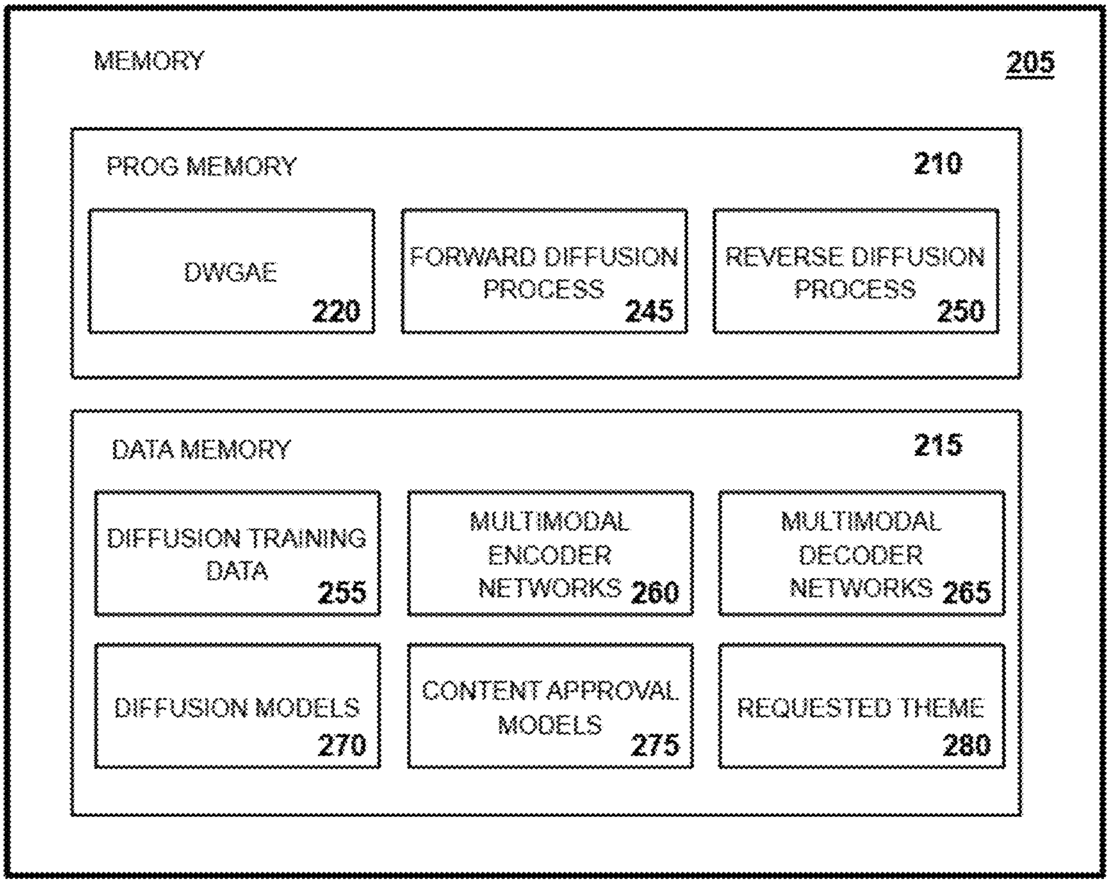
FIG. 3 depicts an exemplary organization of processor executable program instructions and data for an exemplary content derivation platform.

FIG. 3 depicts an exemplary organization of processor executable program instructions and data for an exemplary content derivation platform. In FIG. 3, the depicted detail view of the memory 205 shows the program memory 210 and the data memory 215, also illustrated at least in FIG. 2. In FIG. 3, the depicted program memory 210 includes processor-executable program instructions configured to implement the DWGAE 220.

In FIG. 3, the depicted program memory 210 includes processor-executable program instructions configured to implement the forward diffusion process 245.

In FIG. 3, the depicted program memory 210 includes processor-executable program instructions configured to implement the reverse diffusion process 250.

In FIG. 3, the depicted data memory 215 includes the diffusion training data 255.

In FIG. 3, the depicted data memory 215 includes data configured to implement the encoder networks 260 used by processor-executable program instructions executed by the DWGAE 220.

In FIG. 3, the depicted data memory 215 includes data configured to implement the decoder networks 265 used by processor-executable program instructions executed by the DWGAE 220.

In FIG. 3, the depicted data memory 215 includes data configured to implement the diffusion models 270.

In FIG. 3, the depicted data memory 215 includes data configured to implement the content approval models 275. In FIG. 3, the depicted data memory 215 includes data configured to implement the requested theme 280.

Figure 4:
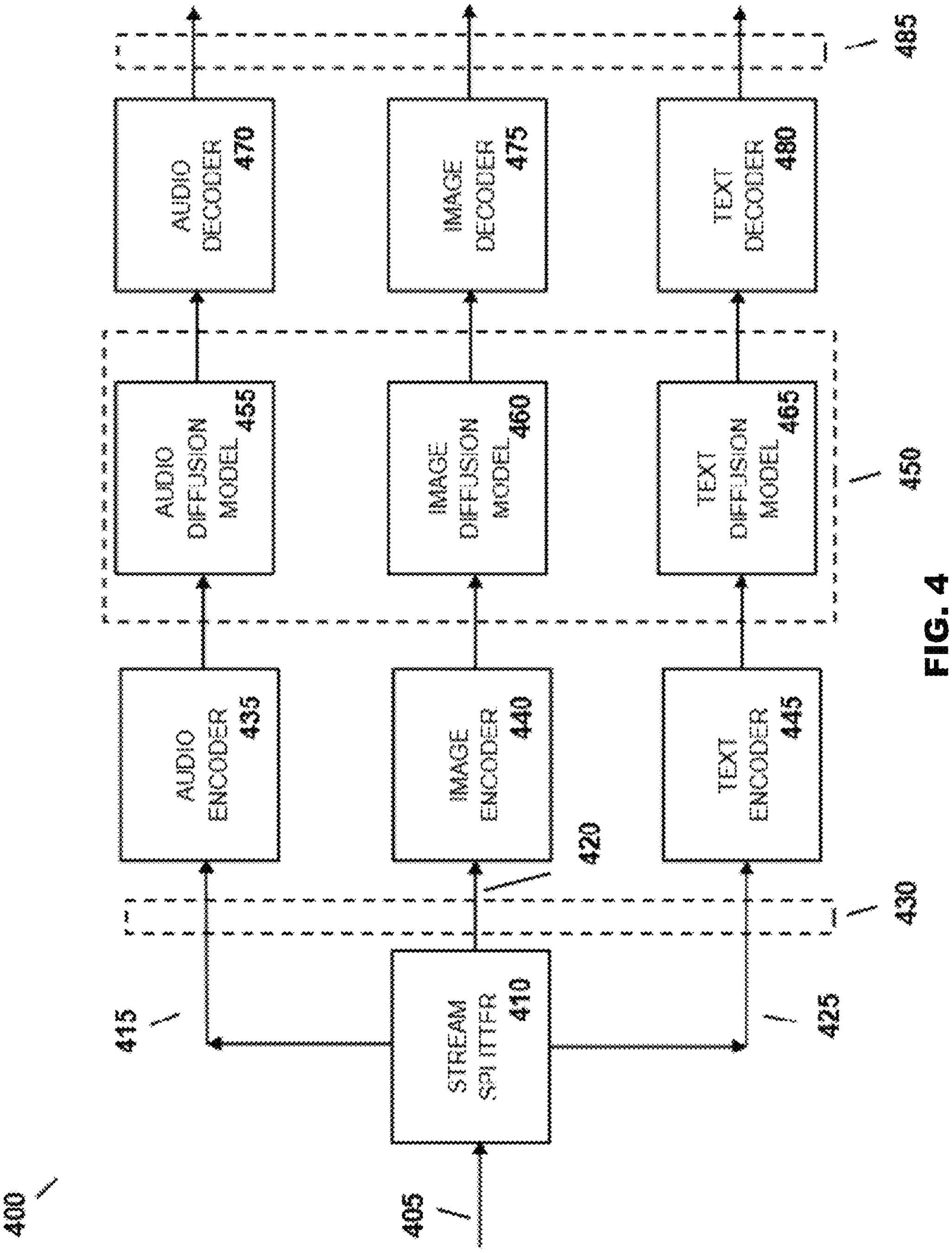
FIG. 4 depicts an exemplary content derivation pipeline.

FIG. 4 depicts an exemplary content derivation pipeline. In FIG. 4, the pipeline 400 receives the content stream 405. The content stream 405 may be predetermined content. The content stream 405 may be derivative content. The content stream 405 may be a multimodal content stream. The multimodal content stream may comprise more than one content modality. Each content modality of a multimodal content stream may be in a distinct format. In the depicted implementation, the stream splitter 410 divides the content stream into one or more discrete content stream. The stream splitter 410 may be configured to detect a modality of an individual content stream within the content stream 405. For example, the stream splitter 410 may be configured to detect a content type determined as a function of data associated with an individual content stream. The stream splitter 410 may be configured to re-route an individual stream to a modality-specific encoder.

In the depicted implementation, the stream splitter 410 detects the audio stream 415, the image stream 420 and the text stream 425 in the content stream 405. In the depicted implementation the audio stream 415, image stream 420 and text stream 425 are data in the input high-dimensional space 430. In the depicted implementation, the input high-dimensional space 430 represents a native data space for the discrete content streams. The native data space for each modality may be different, depending on the modality. For example, in the input high-dimensional space 430, the audio stream 415 may be audio amplitudes sampled as a function of time and the image stream 420 may be pixel values determined as a function of image geometry. The stream splitter 410 may be configured to detect and separate or split audio with a human voice based on one or more techniques comprising autocorrelation.

In the depicted implementation, the audio encoder 435, image encoder 440 and text encoder 445 respectively encode the audio stream 415, the image stream 420 and the text stream 425 from the high-dimensional space 430 to the latent space 450. The latent space 450 represents a lower-dimensional space suitable for operations such as, for example but not limited to, determining and mapping embeddings, and other operations associated with machine learning operations. As with the input high-dimensional space 430, the latent space 450 may be different for each modality. For example, in the latent space 450, the encoded audio stream may be audio features such as Mel spectrogram, log Mel spectrogram, or spectral features, while in contrast, the encoded image stream may be normalized pixel values, edge maps, or object detection features.

In the depicted implementation, the audio diffusion model 455, image diffusion model 460 and text diffusion model 465 operate in the latent space 450. In the depicted implementation, the audio decoder 470, image decoder 475 and text decoder 480 respectively decode the audio diffusion model 455, image diffusion model 460 and text diffusion model 465 outputs from the latent space 450 to the output high dimensional space 485.

Figure 5:
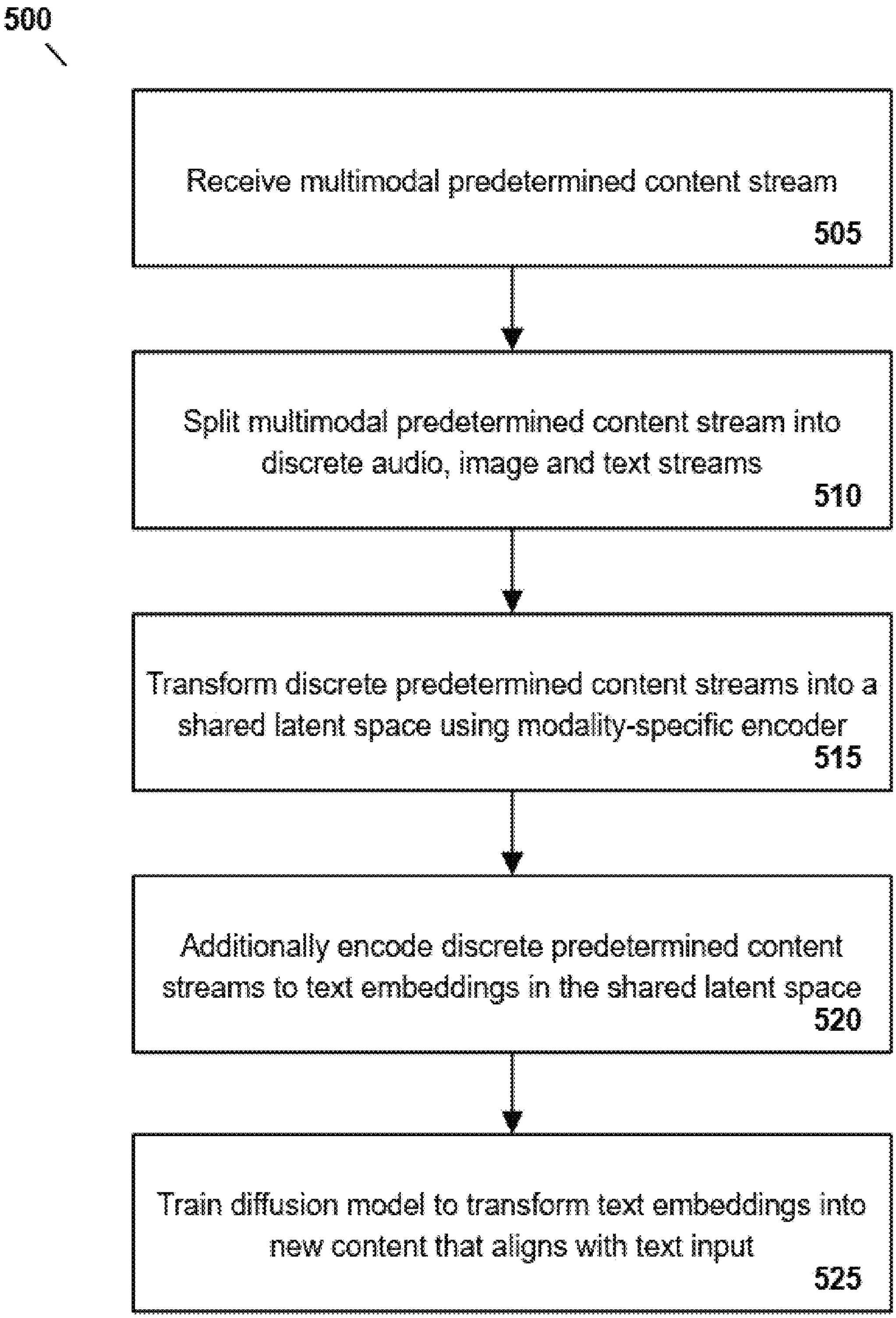
FIG. 5 depicts a process flow of an exemplary Derivative Work Generation and Augmentation Engine (DWGAE) in an exemplary training mode.

FIG. 5 depicts a process flow of an exemplary Derivative Work Generation and Augmentation Engine (DWGAE) in an exemplary training mode. In FIG. 5, the depicted method is given from the perspective of the Derivative Work Generation and Augmentation Engine DWGAE 220 implemented via processor-executable program instructions executing on the content derivation platform 110 processor 200, depicted at least in FIG. 2. In the illustrated implementation, the DWGAE 220 executes as program instructions on the processor 200 configured in the DWGAE 220 host content derivation platform 110, depicted in at least FIG. 1 and FIG. 2. In some implementations, the DWGAE 220 may execute as a cloud service communicatively and operatively coupled with system services, hardware resources, or software elements local to and/or external to the DWGAE 220 host content derivation platform 110. The depicted method 500 begins at step 505 with the processor 200 receiving a multimodal predetermined content stream.

Then, the method continues at step 510 with the processor 200 splitting the multimodal predetermined content stream into one or more discrete content streams. The one or more discrete content streams may include, but are not limited to, discrete audio, image or text streams.

Then, the method continues at step 515 with the processor 200 transforming each discrete predetermined content stream into a shared latent space representation using a modality-specific encoder.

Then, the method continues at step 520 with the processor 200 additionally encoding each encoded discrete predetermined content stream to a text embedding in the shared latent space.

Then, the method continues at step 525 with the processor 200 training a diffusion model to transform the text embeddings representing the predetermined content in the shared latent space into new content that aligns with text input.

In some implementations, the method may repeat. In various implementations, the method may end.

Figure 6:
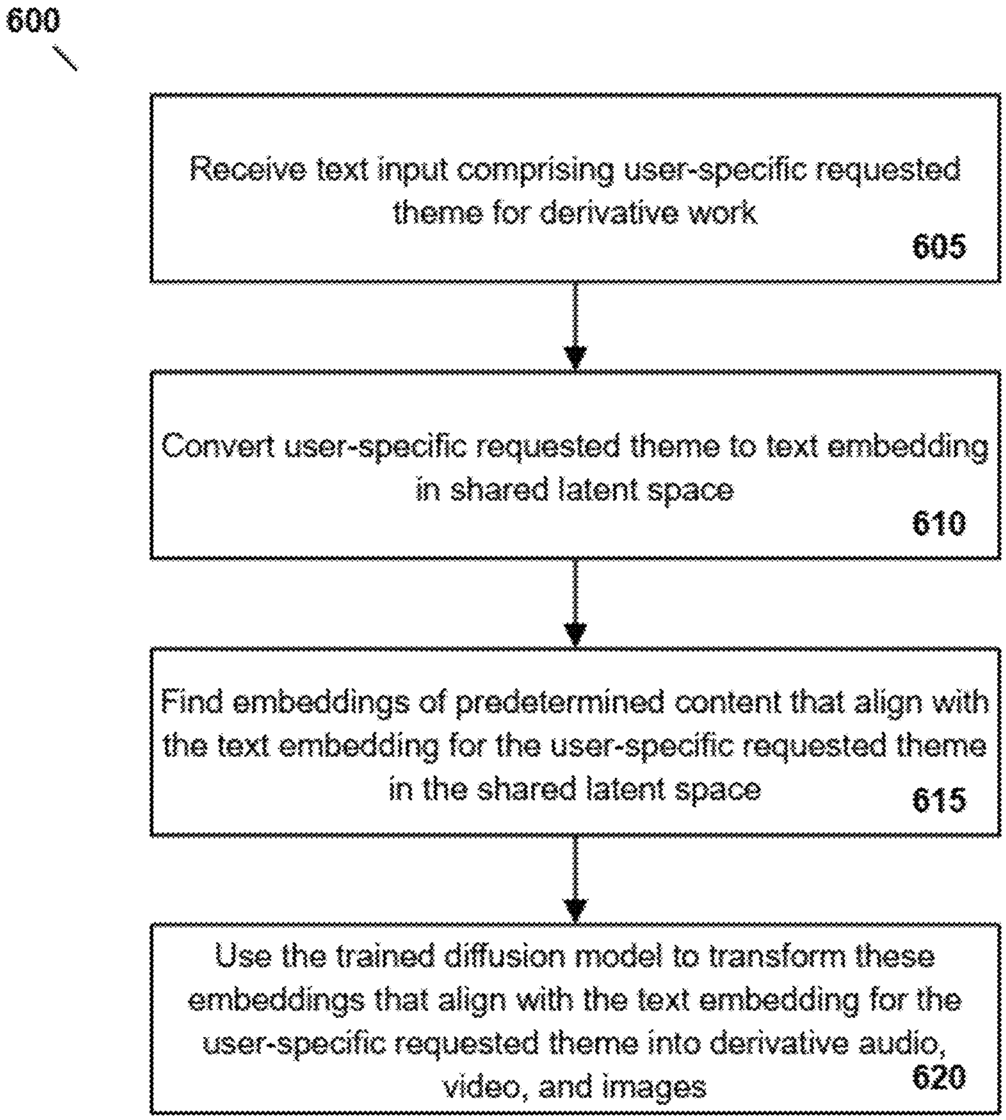
FIG. 6 depicts a process flow of an exemplary Derivative Work Generation and Augmentation Engine (DWGAE) in an exemplary generation mode.

FIG. 6 depicts a process flow of an exemplary Derivative Work Generation and Augmentation Engine (DWGAE) in an exemplary generation mode. In FIG. 6, the depicted method is given from the perspective of the Derivative Work Generation and Augmentation Engine DWGAE 220 implemented via processor-executable program instructions executing on the content derivation platform 110 processor 200, depicted at least in FIG. 2. In the illustrated implementation, the DWGAE 220 executes as program instructions on the processor 200 configured in the DWGAE 220 host content derivation platform 110, depicted in at least FIG. 1 and FIG. 2. In some implementations, the DWGAE 220 may execute as a cloud service communicatively and operatively coupled with system services, hardware resources, or software elements local to and/or external to the DWGAE 220 host content derivation platform 110. The depicted method 600 begins at step 605 with the processor 200 receiving text input comprising a user-specific requested theme for a derivative work.

Then, the method continues at step 610 with the processor 200 converting the user-specific requested theme to a text embedding in a shared latent space.

Then, the method continues at step 615 with the processor 200 finding embeddings of predetermined content that align with the text embedding for the user-specific requested theme in the shared latent space.

Then, the method continues at step 620 with the processor 200 using the trained diffusion model to transform these embeddings of the predetermined content that align with the text embedding for the user-specific requested theme. The processor 200 may transform the predetermined content into a derivative work comprising audio, video or images, based on the embedding for the user-specific requested theme.

In some implementations, the method may repeat. In various implementations, the method may end.

Figure 7:
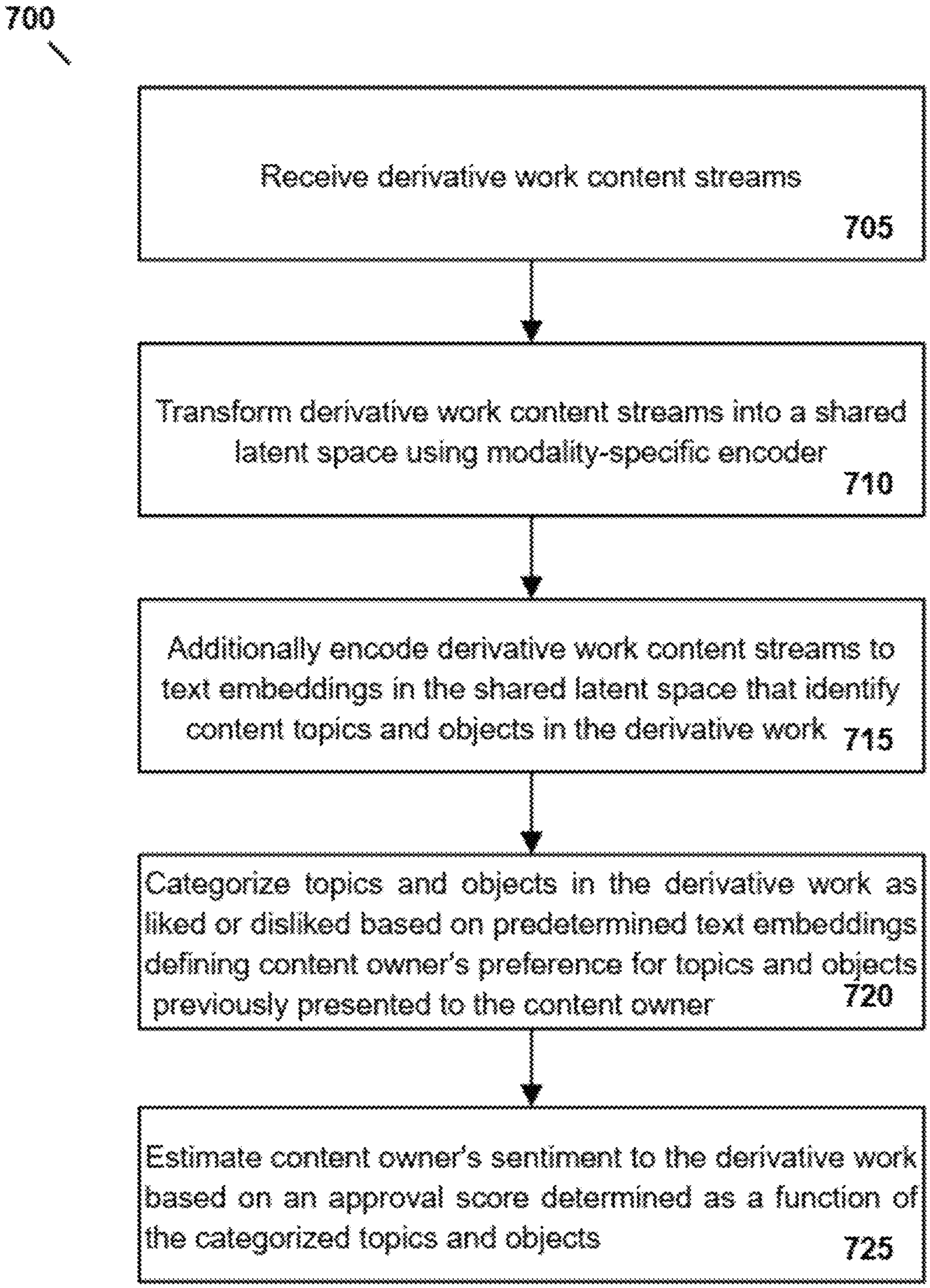
FIG. 7 depicts a process flow of an exemplary Derivative Work Generation and Augmentation Engine (DWGAE) in an exemplary approval mode.

FIG. 7 depicts a process flow of an exemplary Derivative Work Generation and Augmentation Engine (DWGAE) in an exemplary approval mode. In FIG. 7, the depicted method is given from the perspective of the Derivative Work Generation and Augmentation Engine DWGAE 220 implemented via processor-executable program instructions executing on the content derivation platform 110 processor 200, depicted at least in FIG. 2. In the illustrated implementation, the DWGAE 220 executes as program instructions on the processor 200 configured in the DWGAE 220 host content derivation platform 110, depicted in at least FIG. 1 and FIG. 2. In some implementations, the DWGAE 220 may execute as a cloud service communicatively and operatively coupled with system services, hardware resources, or software elements local to and/or external to the DWGAE 220 host content derivation platform 110. The depicted method 700 begins at step 705 with the processor 200 receiving one or more derivative work content streams.

Then, the method continues at step 710 with the processor 200 transforming the one or more derivative work content streams into a shared latent space using a modality-specific encoder.

Then, the method continues at step 715 with the processor 200 additionally encoding the one or more derivative work content streams to text embeddings in the shared latent space that identify content topics and objects in the derivative work.

Then, the method continues at step 720 with the processor 200 categorizing topics and objects in the derivative work as liked or disliked based on predetermined text embeddings and labels defining the content owner's preference for topics and objects previously presented to the content owner. The previously presented items may be labeled as liked or disliked by the content owner. The items previously presented to the content owner may be public items.

Then, the method continues at step 725 with the processor 200 estimating the content owner's sentiment to the derivative work based on an approval score determined as a function of the categorized topics and objects.

An implementation of process 700 may employ a trained content approval model to estimate the content owner's sentiment to the derivative work. A CLIP model may be used to determine text embeddings identifying items including but not limited to topics and objects in public content presented to the content owner in a learning phase. These text embeddings identifying the items may be augmented with labels defining the content owner's preference for the items presented to the content owner during the learning phase. For example, items of various types in public content may be presented to the content owner during the learning phase. In the learning phase, the content owner may be prompted to classify items as liked or disliked by the content owner. A degree of like or dislike may be captured from the content owner for each item. These classifications and degrees of like or dislike by the content owner may be used to label the public items with the classifications and degrees of like or dislike. The method may use a CLIP model to determine text embeddings identifying items in the derivative work. The method may determine classifications and degrees of like or dislike by the content owner for items in the derivative work by comparison with the predetermined classifications and degrees of like or dislike for the public items. For example, a public item may be identified in the public item embeddings as a knife labeled as strongly disliked by the content owner. In this example, based on exemplary derivative work embeddings, the derivative work may not include a knife. In this example, the content owner's sentiment toward the derivative work may be estimated as highly favorable. On the other hand, in this example, if the derivative work includes a knife, the content owner's sentiment toward the derivative work may be estimated as highly unfavorable.

The content approval model may be configured to determine a score identifying a degree of like or dislike by the content owner for a topic, theme, object, work of art, person, place or subject in the derivative work. Training the model may include gathering a dataset that contains examples of text descriptions for items and corresponding like/dislike scores from the content owner. This could include reviews, ratings, or any kind of feedback that quantifies preferences. For each example in the dataset, the text description may be paired with its corresponding score. The content approval model may be a neural network configured to determine a score identifying a degree of like or dislike by the content owner for the derivative work, determined as a function of a text embedding identifying an item in the derivative work. The neural network may be trained using the labeled classifications and degrees of like or dislike for the public items. The output of the content approval model may be a regression layer that outputs a continuous score.

In some implementations, the method may repeat. In various implementations, the method may end.

Although various features have been described with reference to the Figures, other features are possible.

Implementation 1. A method comprising: receiving predetermined content, using a database server; receiving a request to transform the predetermined content into a derivative work, using a content derivation platform comprising at least one processor; receiving a requested theme for the derivative work, using the at least one processor; creating the derivative work generated as a function of the predetermined content and the requested theme, using generative artificial intelligence and the at least one processor; determining if the generated derivative work is approved based on a content approval machine learning model configured to determine a content approval score as a function of a content owner preference and the generated derivative work, using the at least one processor; and in response to determining the content approval score is greater than a predetermined minimum: applying a digital watermark to the approved derivative work, using the at least one processor; configuring an authorization server to govern use of the approved derivative work based on the digital watermark, using the at least one processor; and providing access to the approved derivative work.

Implementation 2. The method of implementation 1, wherein the content comprises music.

Implementation 3. The method of implementation 1, wherein the content comprises audio.

Implementation 4. The method of implementation 3, wherein the audio further comprises a human voice sound.

Implementation 5. The method of implementation 4, wherein the method further comprises detecting the human voice based on a technique comprising autocorrelation, using the at least one processor.

Implementation 6. The method of implementation 5, wherein the autocorrelation further comprises frequency domain autocorrelation, using the at least one processor.

Implementation 7. The method of implementation 3, wherein the audio further comprises a musical instrument sound.

Implementation 8. The method of implementation 1, wherein the requested theme is determined based on an interview with a user, using the at least one processor.

Implementation 9. The method of implementation 8, wherein the interview with the user is performed by a chatbot, using the at least one processor.

Implementation 10. The method of implementation 8, wherein the requested theme is determined based on matching a response from the user with a semantically similar predetermined theme identified by a Large Language Model (LLM) as a function of the response from the user, using the at least one processor.

Implementation 11. The method of implementation 8, wherein the predetermined theme is pre-approved by the content owner.

Implementation 12. The method of implementation 1, wherein the generative artificial intelligence comprises a diffusion model.

Implementation 13. The method of implementation 12, wherein the diffusion model is a latent diffusion model.

Implementation 14. The method of implementation 12, wherein the method further comprises encoding the content to a latent space, using a encoder network.

Implementation 15. The method of implementation 14, wherein the encoder network further comprises a convolutional neural network (CNN) configured to extract mel-frequency cepstral coefficients (MFCCs) from the content.

Implementation 16. The method of implementation 14, wherein the encoder network further comprises a CNN configured to extract a spatial or temporal feature from the content.

Implementation 17. The method of implementation 14, wherein the encoder network further comprises a recurrent neural network (RNN) or a transformer, configured to extract a word embedding from the content.

Implementation 18. The method of implementation 14, wherein the method further comprises decoding the content from the latent space, using a decoder network.

Implementation 19. The method of implementation 1, wherein the content approval machine learning model further comprises a neural network configured to determine a score identifying a degree of like or dislike by the content owner for the derivative work, the score determined as a function of a text embedding identifying an item in the derivative work, using the at least one processor.

Implementation 20. The method of implementation 1, wherein the method further comprises determining a text embedding identifying an item, using a CLIP model.

Implementation 21. The method of implementation 1, wherein the method further comprises converting the requested theme to a text embedding in a shared latent space, using the at least one processor.

Implementation 22. The method of implementation 1, wherein the method further comprises transforming the predetermined content into a derivative work comprising audio, video or images, based on an embedding for the requested theme, using the at least one processor.

Implementation 23. The method of implementation 1, wherein apply the digital watermark further comprises embedding the digital watermark in the derivative work.

Implementation 24. The method of implementation 23, wherein the method further comprises frequency domain embedding of the digital watermark.

Implementation 25. The method of implementation 1, wherein the method further comprises updating the derivative work with a new digital watermark that is valid for a limited time and providing access to the updated derivative work.

Implementation 26. The method of implementation 1, wherein govern use of the approved derivative work further comprises configure a tracking system to determine authenticity of the derivative work, verified as a function of the digital watermark by the tracking system.

Implementation 27. The method of implementation 1, wherein govern use of the approved derivative work further comprises validating user requests for access to the derivative work authorized as a function of the digital watermark.

Implementation 28. The method of implementation 1, wherein govern use of the approved derivative work further comprises automatically request an automated payment via a smart contract execution triggered based on use of the derivative work detected as a function of the digital watermark.

Implementation 29. The method of implementation 1, wherein govern use of the approved derivative work further comprises revoke access to the derivative work upon determining a time-sensitive watermark has expired.

Implementation 30. An article of manufacture comprising: a memory that is not a transitory propagating signal, wherein the memory further comprises computer readable instructions configured that when executed by at least one processor the computer readable instructions cause the at least one processor to perform operations comprising: receive predetermined content; receive a request to transform the predetermined content into a derivative work; receive a requested theme for the derivative work; create the derivative work generated as a function of the predetermined content and the requested theme, using generative artificial intelligence; determine if the generated derivative work is approved based on a content approval machine learning model configured to determine a content approval score as a function of a content owner preference and the generated derivative work; and in response to determining the content approval score is greater than a predetermined minimum: apply a digital watermark to the approved derivative work;

configure an authorization server to govern use of the approved derivative work based on the digital watermark; and provide access to the approved derivative work.

In artificial intelligence, "architecture" refers to the foundational framework of a machine learning model. For example, the architecture of an artificial neural network (ANN) encompasses layers and connections that form a complex mesh of mathematical functions. Each layer processes input data, passes it through activation functions, and transfers the result to the next layer. The architecture determines how data flows through the model, affecting its ability to learn and generalize from data. Engineers need to grasp these structural aspects to build and fine-tune effective models.

Artificial intelligence is a broad field within computer science dedicated to creating systems that emulate human intelligence. This includes capabilities like perception, synthesis, inference, and the ability to learn from data without explicit programming. Machine learning (ML) is a subset of AI that empowers systems to adapt and improve through experience. By employing ML algorithms, engineers can develop systems that progressively enhance their performance based on accumulated data and feedback.

Backpropagation is an essential algorithm for training neural networks, crucial for the optimization of model parameters. It works by calculating the gradient of the loss function with respect to each weight in the network through a process called automatic differentiation. This gradient information is then used to update the weights in the direction that minimizes the loss function, typically using gradient descent. This iterative process fine-tunes the model, improving its predictive accuracy.

Convolutional neural networks (CNNs) are specialized feed-forward neural networks designed for processing grid-like data such as images. CNNs utilize convolutional layers that apply filters to input images, detecting spatial hierarchies of features like edges and textures. These layers are followed by pooling layers that reduce dimensionality, preserving essential information while reducing computational load. This architecture enables CNNs to excel in tasks like image recognition, object detection, and image segmentation.

Diffusion models are generative models that create output by reversing a noise diffusion process. Starting with a noise distribution, the model iteratively refines the data by reducing noise and adding detail until a sample resembling the target distribution is produced. In text-to-image generation, diffusion models leverage embeddings of text prompts to condition the generation process, resulting in images that accurately reflect the described scenes. This approach ensures high fidelity and coherence in the generated content.

An embedding is a dense vector representation of data that captures its inherent properties. These vectors enable efficient comparison and manipulation of data items by placing them in a continuous vector space where similar items are positioned close together. In natural language processing (NLP), embeddings represent words, phrases, or sentences as vectors in a high-dimensional space, facilitating operations like semantic similarity, clustering, and downstream machine learning tasks.

Feed-forward neural networks (FFNNs) are a type of neural network architecture where data flows in a single direction: from the input layer, through one or more hidden layers, to the output layer. Each neuron in a layer is connected to every neuron in the next layer, enabling the network to learn complex mappings from inputs to outputs. This architecture is particularly effective for tasks like regression and classification, where clear input-output relationships exist.

Generative AI encompasses methods focused on creating new, synthetic content such as text, images, or music. These systems use techniques like neural networks, variational autoencoders (VAEs), and transformers to generate data based on learned patterns. For instance, diffusion models and transformers can produce high-quality content conditioned on user-provided prompts or reference data, enabling applications in creative fields like art, writing, and design.

Large language models (LLMs) are sophisticated machine learning models trained on extensive text corpora. These models leverage architectures like transformers to generate human-like text by predicting the next token in a sequence based on preceding context. LLMs utilize techniques such as attention mechanisms to handle long-range dependencies, enabling them to produce coherent and contextually relevant outputs across various language-related tasks.

Natural language processing (NLP) is a subfield of AI dedicated to the interaction between computers and human language. NLP tasks include language understanding, translation, and generation, employing techniques like tokenization, part-of-speech tagging, and syntactic parsing. Advanced models, such as transformers, use embeddings and attention mechanisms to process and generate natural language, enabling applications like chatbots, virtual assistants, and automated content creation.

Recurrent neural networks (RNNs) are neural networks designed for sequential data processing. Unlike feed-forward networks, RNNs have connections that loop back, allowing them to maintain a state that captures information about previous inputs. This makes RNNs particularly suited for tasks like time-series prediction and natural language processing, where context and order are crucial. Variants like long short-term memory (LSTM) networks address the vanishing gradient problem, enhancing the ability to learn long-range dependencies.

Reinforcement learning (RL) is a machine learning paradigm where an agent learns to make decisions by interacting with an environment. The agent selects actions based on a policy and receives feedback through rewards or penalties. Over time, the agent optimizes its policy to maximize cumulative rewards, using algorithms like Q-learning or policy gradients. RL is effective for tasks requiring strategic decision-making, such as game playing, robotics, and autonomous driving.

Self-supervised learning is a technique where a model learns from unlabeled data by solving pretext tasks. These tasks generate supervisory signals from the data itself, allowing the model to learn useful representations. For example, a model might predict the missing parts of an image or the next word in a sentence. Self-supervised learning leverages large amounts of unlabeled data, making it a powerful approach for representation learning in domains like vision and NLP.

Semi-supervised learning combines labeled and unlabeled data during training to leverage the strengths of both supervised and unsupervised learning. This approach is beneficial when labeled data is scarce or expensive to obtain. Techniques like pseudo-labeling, co-training, and graph-based methods help propagate labels from labeled to unlabeled data, improving model performance and generalization by utilizing the available data more effectively.

Supervised learning involves training machine learning models using a dataset where each input is paired with a corresponding output label. The model learns to map inputs to outputs by minimizing a loss function, typically through iterative optimization techniques like gradient descent. Supervised learning is used for tasks where historical data is available, such as classification, regression, and object detection, enabling accurate predictions on new, unseen data.

Transformers are a neural network architecture designed to handle sequential data, excelling in tasks like natural language processing. They rely on self-attention mechanisms to weigh the importance of different parts of the input sequence, allowing parallel processing and capturing long-range dependencies without recurrence. This architecture underpins many state-of-the-art language models, enabling complex tasks like translation, summarization, and question answering with high accuracy.

Unsupervised learning aims to uncover hidden patterns or structures within unlabeled data. Algorithms like clustering and dimensionality reduction analyze the data to group similar items or reduce its complexity. This approach is useful for exploratory data analysis, anomaly detection, and feature learning, providing insights and revealing relationships within data that might not be immediately apparent.

Diffusion Models: Architecture, Training and Usage

In an illustrative example, the disclosed system comprises a diffusion model, a noise Scheduler, and an image synthesizer. The diffusion model is responsible for generating images from Gaussian noise, while the noise scheduler controls the amount of noise added to the input signal during training, and the image synthesizer generates high-quality images from the output of the diffusion model.

An exemplary diffusion model may comprise a forward process and a reverse process. An exemplary forward diffusion process takes in a Gaussian noise signal as input and applies a series of transformations to progressively refine the noise signal, until it converges to a real image. An exemplary reverse diffusion process takes in a real image and applies a reverse sequence of transformations to transform it back into a Gaussian noise signal.

An exemplary diffusion model may comprise multiple layers, each of which may include one or more of the following components:

1. Noise Scheduler: This component controls the amount of noise added to the input signal during training. The noise schedule is a sequence of noise levels used during training. Each level in the noise schedule corresponds to a specific loss function.

2. Loss Function: The loss function is used to evaluate the performance of the model during training. A common choice for a diffusion model is the Beta-VAE (Variational Autoencoder) loss.

3. Transformer Blocks: These blocks consist of two transformer layers that process the input signal and apply transformations to refine it.

4. Upsampling Layers: These layers upsample the output of the previous layer, allowing the model to increase the spatial resolution of the image.

5. Residual Connections: These connections allow the model to preserve some information from the previous layer, improving its ability to generate high-quality images.

6. Optimization Algorithm: The optimization algorithm is used to update the model parameters during training. A common choice for a diffusion model is stochastic gradient descent (SGD).

In an exemplary diffusion model training mode, the data flows through the following components:

1. Noise Scheduler: The noise scheduler takes in a batch of Gaussian noise signals as input and generates a schedule for adding noise to the signal.

2. Forward Process: The forward process takes in the Gaussian noise signal and applies the transformations specified by the noise schedule to progressively refine it.

3. Reverse Process: The reverse process takes in a real image and applies the reverse sequence of transformations to transform it back into a Gaussian noise signal.

In an exemplary diffusion model inference mode, the data flows through the following components:

1. Noise Scheduler: The noise scheduler generates a noise schedule for adding noise to an input signal.

2. Forward Process: The forward process takes in the input signal and applies the transformations specified by the noise schedule to generate an image.

3. Image Synthesizer: The image synthesizer takes in the output of the forward process and refines it to produce a high-quality image.

A diffusion model may be trained using a combination of two objectives:

1. Reconstruction Loss: Minimize the difference between the input signal and its reconstructed version based on the output of the diffusion model.

2. KL Divergence: Maximize the similarity between the output of the diffusion model and a target distribution.

An exemplary diffusion model training process involves the following steps:

1. Initialization: Initialize the weights of the Diffusion Model using a pre-trained model or random weights.

2. Training Loop: Iterate through the dataset, applying the forward process to generate images from Gaussian noise.

3. Backward Pass: Apply the backward pass to compute the gradients of the reconstruction loss and KL divergence with respect to the model parameters.

4. Weight Update: Update the model parameters using the computed gradients.

Latent Diffusion Model Architecture, Training and Use

The disclosed generative artificial intelligence system is designed to utilize a latent diffusion model to generate derivative content comprising audio, video, and images from predetermined content. Exemplary architecture, algorithms, and programming are detailed below:

The latent diffusion model is based on the Denoising Diffusion Probabilistic Model (DDPM). This model consists of a forward process that progressively refines the input noise signal to generate a synthetic data sample, and a reverse process that estimates the noise schedule from the generated sample.

Training:

The DDPM is trained on a dataset consisting of paired pairs of content and derivative content. The content is represented as a fixed-size vector, while the derivative content is represented as a 3D tensor with dimensions (batch size)×(sequence length)×(feature dimension). During training, the model learns to predict the noise schedule from the generated synthetic data samples.

1. Data Preparation: A dataset consisting of paired pairs of content and derivative content is prepared for training.

2. Model Initialization: The latent diffusion model is initialized with a random noise schedule.

3. Training Loop: The training loop consists of the following steps:

a. Forward Process: The forward process refines the input noise signal to generate a synthetic data sample.

b. Reverse Process: The reverse process estimates the noise schedule from the generated sample.

c. Loss Calculation: The loss is calculated using a combination of reconstruction loss and KL divergence loss.

4. Training Optimization: The training optimization algorithm is used to update the model parameters during each iteration.

Contrastive Language-Image Pretraining (CLIP) Embeddings:

The CLIP embeddings are used to generate text representations for the requested theme. The CLIP model is trained on a large dataset of paired text-image pairs and consists of two branches:

1. Text Encoder: This branch takes in the input text and generates a fixed-size vector representation.

2. Image Encoder: This branch takes in an image and generates a fixed-size vector representation.

Integration with Latent Diffusion Model:

The CLIP embeddings are integrated into the latent diffusion model by utilizing the text encoder to generate a text representation for the requested theme. The text representation is then used to fine-tune the DDPM on the derivative content dataset.

Derivative Work Generation:

1. Text Input Processing: The user's input theme is processed through the CLIP model to generate a text representation.

2. Latent Diffusion Model Fine-tuning: The generated text representation is used to fine-tune the DDPM on the derivative content dataset.

3. Denoising Diffusion Probabilistic Model: The trained DDPM is used to generate synthetic data samples from the predetermined content.

4. Content Augmentation: The generated synthetic data sample is augmented with additional information, such as metadata, captions, or music lyrics, to create a more comprehensive derivative work.

Algorithms and Programming:

1. Mathematical Framework: The system's mathematical framework is based on the Denoising Diffusion Probabilistic Model (DDPM).

2. Programming Language: The system is implemented in Python using popular libraries such as TensorFlow, PyTorch, or JAX.

3. Deep Learning Architecture: The DDPM consists of a forward process and a reverse process, which are implemented using deep learning architectures such as convolutional neural networks (CNNs) or fully connected neural networks (FCNNs).

4. Contrastive Language-Image Pretraining (CLIP): The CLIP embeddings are generated using the CLIP model implemented in Python.

Programming Details:

1. Latent Diffusion Model Implementation: A custom implementation of the DDPM is written in Python using TensorFlow or PyTorch.

2. Contrastive Language-Image Pretraining (CLIP) Embeddings Generation: The CLIP embeddings are generated using a pre-trained CLIP model implemented in Python.

3. Derivative Work Generation: The system generates the derivative work by fine-tuning the DDPM on the derivative content dataset and augmenting the generated synthetic data sample with additional information.

Use:

1. Data Preparation: A dataset consisting of paired pairs of content and derivative content is prepared for training.

2. Model Training: The latent diffusion model is trained on the dataset using a pre-trained CLIP model to generate text representations for the requested theme.

3. Model Fine-tuning: The generated text representation is used to fine-tune the DDPM on the derivative content dataset.

4. Derivative Work Generation: The system generates the derivative work by integrating the latent diffusion model with the CLIP embeddings.

Use Cases:

1. Image Generation: The system can be used to generate images based on user-specific themes.

2. Video Generation: The system can be used to generate videos based on user-specific themes.

3. Music Generation: The system can be used to generate music based on user-specific themes.

Encoder and Decoder Networks

Encoder Network: An exemplary diffusion model architecture may comprise an encoder network and a decoder network. The encoder network is responsible for encoding the input data into a compact latent representation, while the decoder network generates the final output sample from this latent representation.

The encoder network typically consists of a series of transposed convolutional layers (also known as downsampling layers) followed by a bottleneck layer. The transposed convolutional layers reduce the spatial dimensions of the input data, while the bottleneck layer reduces the number of channels in the feature maps. This process compresses the input data into a compact latent representation, which is used as input to the decoder network.

Decoder Network: The decoder network typically consists of a series of transposed convolutional layers (also known as upsampling layers) followed by a bottleneck layer. The transposed convolutional layers increase the spatial dimensions of the input data, while the bottleneck layer reduces the number of channels in the feature maps. This process expands the latent representation into a high-dimensional space, allowing the decoder network to generate high-quality output samples.

The proposed architecture comprises modality-specific encoder networks and decoder networks, trained to extract domain-specific features from multimodal content using a diffusion model. The architecture is designed to support multiple modalities, including audio, video, images, and text.

Modality-Specific Encoder Network (MESN): The MESN is responsible for extracting domain-specific features from the input multimodal content. Each modality has its own encoder network, which takes as input a sequence of pixels or frames representing that modality. The output of each encoder network is a fixed-size vector representation of the modality-specific features.

1. Audio Encoder Network: For audio data, the MESN uses a 1D convolutional neural network (CNN) with kernel size 3×1 and stride 2 to extract mel-frequency cepstral coefficients (MFCCs). The output of this layer is fed into a fully connected layer with ReLU activation to produce a fixed-size vector representation of audio features.

2. Video Encoder Network: For video data, the MESN uses a 3D convolutional neural network (CNN) with kernel size 3×3×3 and stride 2 to extract spatial and temporal features. The output of this layer is fed into a fully connected layer with ReLU activation to produce a fixed-size vector representation of video features.

3. Image Encoder Network: For image data, the MESN uses a 2D convolutional neural network (CNN) with kernel size 7×7 and stride 2 to extract spatial features. The output of this layer is fed into a fully connected layer with ReLU activation to produce a fixed-size vector representation of image features.

4. Text Encoder Network: For text data, the MESN uses an encoder-based recurrent neural network (RNN) such as LSTM or GRU to extract word embeddings.

The output of each modality-specific encoder network may be concatenated to form a multimodal feature vector.

Multimodal Diffusion Model Training: The diffusion model is trained on the multimodal feature vectors extracted by the MESN. The diffusion model takes as input a sequence of noise samples and outputs a sample from the target distribution (in this case, a conditional distribution over text).

1. Noise Schedule: A learned noise schedule is used to gradually add noise to the input sequence during training.

2. Diffusion Process: The diffusion process involves iteratively applying a series of transformations to the input sequence, with each transformation adding more noise. The final output is sampled from the target distribution.

Modality-Specific Decoder Network (MDDN): The MDDN is responsible for extracting domain-specific features from the derivative multimodal content generated by the diffusion model.

1. Text Decoder Network: For text data, the MDDN uses an encoder-based RNN such as LSTM or GRU to extract word embeddings.

2. Audio Decoder Network: For audio data, the MDDN uses a 1D CNN with kernel size 3×1 and stride 2 to extract MFCCs from the output of the diffusion model.

3. Video Decoder Network: For video data, the MDDN uses a 3D CNN with kernel size 3×3×3 and stride 2 to extract spatial and temporal features from the output of the diffusion model.

4. Image Decoder Network: For image data, the MDDN uses a 2D CNN with kernel size 7×7 and stride 2 to extract spatial features from the output of the diffusion model.

The output of each modality-specific decoder network may be concatenated to form a derivative multimodal feature vector.

Contrastive Language-Image Pretraining (CLIP)

An exemplary Contrastive Language-Image Pretraining (CLIP) implementation may comprise two models trained in parallel, such as for example, a Vision Transformer (ViT) or ResNet model for image embeddings and a transformer model for language embeddings.

During training, (image, text) pairs are fed into the respective models, and both output a 512-dimensional vector embedding that represents the respective image/text in vector space.

The contrastive component takes these two vector embeddings and calculates the model loss as the difference (e.g., contrast) between the two vectors. Both models are then optimized to minimize this difference and therefore learn how to embed similar (image, text) pairs into a similar vector space.

This contrastive pretraining process produces a CLIP model, a multi-modal model capable of understanding both language and images via a shared vector space.

The CLIP architecture is built around the concept of pretraining two distinct models in parallel: one for image embeddings and another for language embeddings. The former is typically based on a Vision Transformer (ViT) or ResNet model, which is designed to extract spatial hierarchies from images. This hierarchical representation serves as the foundation for the subsequent transformer model.

The language embedding model, on the other hand, relies on a transformer architecture specifically tailored to natural language processing tasks. This model takes in textual input and produces a 512-dimensional vector embedding that captures the essence of the text's semantic meaning.

During training, the CLIP model is fed with pairs of image-text data, where each pair consists of an image and its corresponding caption. The two models are trained independently to produce these respective embeddings. This process enables the models to learn shared representations for both images and texts in a multi-modal space.

The contrastive component plays a crucial role in this pretraining phase. By computing the difference between the two vector embeddings, the model learns to align similar image-text pairs in the same vector subspace. In other words, the model is trained to maximize the similarity between positive (matched) and negative (unmatched) pairs. This process allows the models to develop a deeper understanding of the interplay between language and images.

The two models are optimized jointly using this loss function to minimize the difference between positive pairs and maximize it for negative pairs. This iterative process enables the models to converge on a shared vector space that captures both semantic meaning and visual features.

Upon completion of the pretraining phase, the CLIP model is left with a rich representation of language and images in a multi-modal space. This capacity allows CLIP to tackle a wide range of tasks, including but not limited to:

1. Image captioning: where the model predicts a caption for a given image.
2. Visual question answering (VQA): where the model answers questions about an image based on its semantic content.
3. Image retrieval: where the model retrieves images with similar captions.

Exemplary Alternative Implementation

The proposed system utilizes a type of generative artificial intelligence (GAI) model, specifically a diffusion model, to transform predetermined content into derivative works based on user-specific input. The GAI model takes in two primary inputs: the predetermined content and the user's requested theme as text input. The output is a transformed derivative work that aligns with the user's desired aesthetic or style.

The proposed system consists of three primary components:

1. Content Encoder: This component processes the predetermined content (e.g., audio, music, voice sounds, images, or video) and extracts relevant features or representations. The content encoder can be based on a convolutional neural network (CNN) or recurrent neural network (RNN) architecture.
2. Theme Embedder: This component takes in the user's requested theme as text input and generates a numerical representation (embedding) that captures the essence of the theme. The theme embedder can be based on a language model, such as a transformer-based architecture.
3. Diffusion Model: This component utilizes a diffusion model to transform the content embedding into a derivative work that aligns with the user's requested theme. The diffusion model consists of multiple layers, each of which applies a series of transformations to the input signal.

Training: The proposed system is trained using an unsupervised approach, where the GAI model learns to generate derivative works from predetermined content without explicit supervision. The training process involves the following steps:

1. Data Preparation: Collect a large dataset of paired content and theme inputs.
2. Content Encoder Training: Train the content encoder on the collected data to learn features or representations that capture the essence of the content.
3. Theme Embedder Training: Train the theme embedder on the user's requested themes to generate numerical representations (embeddings) that capture the essence of each theme.
4. Diffusion Model Training: Train the diffusion model using a combination of two objectives:
   a. Reconstruction Loss: Minimize the difference between the input content and its reconstructed version based on the output of the diffusion model.
   b. Theme Alignment Loss: Maximize the similarity between the output of the diffusion model and the corresponding theme embedding.

Implementation: The proposed system can be implemented using a variety of programming languages and frameworks, such as Python with TensorFlow or PyTorch, or JavaScript with WebAssembly (WASM). The content encoder and theme embedder can be implemented using pre-existing libraries or frameworks, while the diffusion model requires custom implementation.

Use Cases: The proposed system has numerous applications in various fields, including:

1. Content Generation: Generate new audio, music, voice sounds, images, or video content based on user requests.
2. Style Transfer: Transfer the style of one image to another based on user input.
3. Music Composition: Generate original music compositions based on user-provided themes and styles.

Exemplary Alternative Implementation

Contrastive Language-Image Pretraining (CLIP) is a framework for pretraining language models, which has been successfully applied to various vision-language tasks, including image-text retrieval and generation. In the context of the present disclosure, CLIP embeddings may play a role in generating derivative works based on the user-requested theme.

Design:

1. CLIP Embedding Generation: During the user interview with the chatbot, the large language model (LLM) generates text representations for the user's input theme using a pre-trained language model such as BERT or ROBERTa.
2. Image Retrieval: The LLM uses CLIP to retrieve images from an image database that are semantically similar to the generated text representation of the theme. This step is based on the concept of contrastive learning, where the model learns to distinguish between similar and dissimilar pairs of images.
3. Audio and Video Generation: Alternatively, the system can use CLIP to generate audio or video representations for the theme. This involves creating a music library that corresponds to specific text prompts (e.g., genre, mood, style).

Configuration:

1. CLIP Model Architecture: The proposed system will utilize a variant of the CLIP model architecture, such as CLIP-Vision-Bert or CLIP-Audio-Bert.
2. Image Database and Audio/Video Library: A large dataset of images and audio/videos will be required for training the CLIP embeddings. This dataset should cover various genres, styles, and themes to ensure diverse representations.

Programming:

1. CLIP Embedding Generation: The system will utilize the CLIP library (e.g., TensorFlow or PyTorch) to generate embeddings from the generated text representation of the theme.
2. Image Retrieval and Filtering: The system will use a clustering algorithm (e.g., k-means or hierarchical clustering) to group semantically similar images retrieved by CLIP. This step involves selecting representative images that best capture the essence of the theme.
3. Audio/Video Generation: The system can utilize music libraries like Music Information Retrieval (MIR) datasets, which contain labeled audio representations for various genres and moods.

Training:

1. Pretraining: The CLIP model is pretrained on a large dataset consisting of paired text-image or text-audio pairs.
2. Fine-tuning: The pre-trained CLIP model is fine-tuned on the user-specific theme using the generated text representation. This step involves adjusting the model parameters to better align with the specific theme.

Use:

1. Derivative Work Generation: The system uses the CLIP embeddings to generate supplemental content (images, audio, or video) based on the user-requested theme.
2. Content Augmentation: The generated content can be augmented with additional information, such as metadata, captions, or music lyrics, to create a more comprehensive derivative work.

Exemplary Digital Watermarking Implementation

The disclosed digital watermarking system may comprise several key components:

1. Content Creation Module: This module is responsible for generating unique watermarks for approved derivative works. The watermarks are embedded into the multimedia content using a combination of encryption algorithms and steganography techniques.
2. Digital Fingerprint Generation Module: This module generates digital fingerprints (e.g., MD5 or SHA-256 hashes) of the watermarked content. These fingerprints serve as unique identifiers for each derivative work.
3. Tracking and Control System: This system is responsible for detecting and verifying the authenticity of watermark-enabled multimedia content on the global internet. It uses a peer-to-peer network architecture to facilitate efficient data exchange between watermark detectors, content providers, and users.
4. Authorization Service: This module validates user requests for access to watermarked content and provides authorization decisions based on predefined rules and policies.

Algorithms and Programming:

The disclosed digital watermarking system may employ various algorithms and techniques to ensure robust security, scalability, and efficiency:

1. Advanced Encryption Algorithms: The system utilizes state-of-the-art encryption algorithms (e.g., AES-256) to protect the watermarks from unauthorized access.
2. Steganographic Techniques: Steganography-based embedding techniques (e.g., least significant bit substitution or transform coding) are employed to conceal the watermark within the multimedia content, ensuring minimal impact on video quality and data transmission efficiency.
3. Digital Fingerprint Generation: The system utilizes cryptographic hash functions (e.g., SHA-256) to generate unique digital fingerprints for each derivative work, allowing for efficient identification and verification of watermark-enabled content.

4. Peer-to-Peer Networking: The tracking and control system employs peer-to-peer networking protocols (e.g., BitTorrent or P2P protocols) to facilitate data exchange between watermark detectors, content providers, and users, ensuring scalability and low latency.

Technical Details:

The disclosed digital watermarking system may leverages the latest advancements in multimedia technology, including:

1. HMAC-Based Watermark Embedding: The system employs a hybrid approach combining HMAC (Keyed-Hash Message Authentication Code) with steganographic techniques to ensure robust watermark embedding.

2. Deep Learning-based Content Analysis: The tracking and control system incorporates deep learning-based content analysis techniques for efficient detection of watermark-enabled multimedia content.

3. Quantum-Secure Communication: The authorization service utilizes quantum-resistant encryption algorithms (e.g., Lattice-based cryptography) to provide secure communication channels between users and content providers.

Exemplary Digital Watermarking Implementation

The disclosed digital watermarking system may embed unique identifiers into digital content. These identifiers facilitate the authorization, tracking, and control of derivative works. The system employs state-of-the-art algorithms and protocols to ensure secure and efficient management of digital rights. The architecture of the digital watermarking system may be divided into three primary components: the watermarking engine, the authorization server, and the tracking module.

Watermarking Engine:

- Input Processor: Receives the original digital content.
- Watermark Embedder: Utilizes robust algorithms to embed unique identifiers into the digital content.
- Output Generator: Produces watermarked content for distribution.

Authorization Server:

- User Authentication: Verifies the credentials of users requesting access to derivative works.
- License Manager: Issues licenses based on predefined policies and user credentials.
- Access Control List (ACL): Maintains a record of authorized users and their permissions.

Tracking Module:

- Log Analyzer: Monitors and logs access to watermarked content.
- Reporting Engine: Generates reports on the usage and dissemination of derivative works.
- Alert System: Triggers alerts for unauthorized access or distribution.

Algorithms

Watermarking Algorithm:

DCT-based Watermarking: Discrete Cosine Transform (DCT) is employed to embed watermarks in the frequency domain, ensuring robustness against various attacks.

Spread Spectrum Technique: Enhances the security of the watermark by distributing it across multiple frequency bands.

Blind Detection: Allows detection of the watermark without requiring the original content, facilitating easier tracking and verification.

Authorization Algorithm:

RSA Encryption: Ensures secure communication between the user and the authorization server.

Digital Signatures: Authenticates the source and integrity of digital licenses issued by the License Manager.

One-Time Passwords (OTPs): Adds an extra layer of security for user authentication.

Tracking Algorithm:

Log Correlation: Correlates logs from multiple sources to identify patterns and anomalies in content usage.

Machine Learning Classifiers: Employs classifiers to predict potential unauthorized usage based on historical data.

Blockchain Ledger: Utilizes blockchain technology to create an immutable record of all transactions, enhancing transparency and security.

In general terms, the present disclosure is directed to a system that uses generative artificial intelligence to create derivative works based on user prompts and themes from copyrighted content, such as music. The system may include a mechanism for obtaining approval from the content owner and marking the derivative work with a digital watermark for tracking its use. Advantageously, the present disclosure addresses the problem of copyright infringement and lack of proper management in the ai-generated music industry by providing a secure, standardized SaaS platform that ensures proper ip rights management, facilitates licensing, and guarantees appropriate compensation for artists, labels, and other stakeholders. According to an aspect of the disclosure, there is provided a method for transforming predetermined content using generative artificial intelligence. The content may be copyrighted and digitally controlled by a cloud-based authorization server. The method may include receiving a user request to create a derivative work using the generative artificial intelligence. The request comprises a prompt from the user to cause the generative artificial intelligence to create the derivative work as a function of the predetermined content and a user specific theme for the derivative work. The method may include determining if the derivative work is approved for creation using ai modeling the content owner. In response to determining the derivative work is approved, the method may include creating the generative artificial intelligence derivative work and marking the work with a digital watermark for tracking use of the generative artificial intelligence derivative work. The content may be music.

An implementation in accordance with the present disclosure may be configured to transform predetermined content using generative artificial intelligence. The system receives a request to transform the predetermined content. The predetermined content may be copyrighted and digitally controlled by a cloud-based authorization server. Advantageously, the system addresses the growing concern in the music industry regarding the use of copyrighted material by AI engines to create derivative works. This concern is not just theoretical but has real-world implications. For instance, consider a scenario where an AI engine uses a copyrighted melody from a popular song to create a new piece of music. Without proper management and control, this could lead to copyright infringement, resulting in legal disputes and potential financial losses for the original copyright holder. The system ensures that the use of copyrighted material is properly managed. This is achieved through a series of checks and balances. For example, when a user submits a request to create a derivative work, the system first verifies the copyright status of the original content. If the content is copyrighted, the system then checks whether the user has the necessary permissions to use the content. This could involve checking a database of licensing agreements or contacting the copyright holder directly. The rights of the copyright holders are respected in this process. This is not just a matter of legal compliance, but also of ethical business practices. By ensuring that copyright holders are properly compensated for the use of their work, the system promotes a fair and sustainable music industry.

An implementation in accordance with the present disclosure may use a cloud-based authorization server to digitally control the copyrighted content. This server acts as a gatekeeper, controlling access to the copyrighted content. For example, if a user tries to access the content without the necessary permissions, the server can deny the request. The server can also track the use of the content, providing valuable data on how, when, and by whom the content is being used. This digital control is particularly important in the context of the ongoing legal battles between record labels and AI engines over the unauthorized use of copyrighted material. For instance, in a recent case, a record label sued an AI engine for using a copyrighted melody without permission.

In an illustrative hypothetical, an AI engine may have argued that it had created a new, original work, but a court may have ruled in favor of the record label. With the disclosed system, such disputes could be avoided, as the use of copyrighted material is controlled and tracked from the outset. The system also provides a platform for the proper management of IP rights. This includes not only copyright, but also related rights such as performance rights and mechanical rights. The platform allows for the registration, administration, and enforcement of these rights, providing a one-stop solution for IP management in the music industry.

The payment of royalties to artists, music labels, and distribution partners is also facilitated by the system. For example, when a derivative work is created and sold, the system can automatically calculate and distribute the appropriate royalties. This ensures that all parties involved in the creation and distribution of the music are fairly compensated. Additionally, the system receives a user request to create a derivative work using the generative artificial intelligence, wherein the request may comprise a prompt from the user to cause the generative artificial intelligence to create the derivative work as a function of the predetermined content and a user specific theme for the derivative work. Advantageously, the system allows for the creation of derivative works using generative artificial intelligence, which is a type of ai that focuses on creating new content. This contrasts with traditional AI, which solves specific tasks with predefined rules.

The user request may include a prompt that triggers the generative ai to create the derivative work based on the predetermined content and a user-specific theme. This allows for the creation of unique and personalized derivative works, while ensuring that the use of the copyrighted material is properly managed and controlled.

The system also provides a platform for the negotiation and execution of licensing agreements, ensuring that the rights of the copyright holders are respected and that they are compensated for the use of their work. The system then determines if the derivative work is approved for creation using ai modeling of the content owners. In response to determining that the derivative work is approved, it creates the generative artificial intelligence derivative work and marks it with a digital watermark for tracking use of the generative artificial intelligence derivative work.

In this example, it is assumed that the content may be music. Advantageously, the system uses ai modeling to determine if the derivative work is approved for creation. This ensures that the derivative work is created in a manner that respects the rights of the content owner. Once the derivative work is approved, the system creates the derivative work using generative ai and marks it with a digital watermark. This allows for the tracking of the use of the derivative work, ensuring that the rights of the copyright holders are respected and that they are compensated for the use of their work.

The system also provides a platform for the reporting and payment of royalties, ensuring that the artists, music labels, and distribution partners are compensated for the use of their work. This is particularly important in the context of the music industry, where the unauthorized use of copyrighted material is a major concern. It will be understood that the term "generative artificial intelligence" as used herein may refer to a type of AI technology that can autonomously generate new content, such as music or other forms of media, based on learned patterns and inputs from existing copyrighted content. It will be understood that the term "generative artificial intelligence derivative work" as used herein may refer to a new piece of content, such as a song or artwork, that is created by an AI system using inspiration or elements from existing copyrighted material and is marked with a digital watermark for tracking its use.

It will be understood that the term "digital watermark" as used herein may refer to an embedded and often imperceptible marker or identifier in a digital asset, such as audio, video, or image data, that can be used for copyright protection, content tracking, and verification of the authenticity or ownership of the derivative work. It will be understood that the term "cloud-based authorization server" as used herein may refer to a remote server hosted on the internet that manages and verifies user permissions for accessing and manipulating copyrighted content, such as music, in the creation of derivative works. It will be understood that the term "AI modeling" as used herein may refer to the process or method employed by the generative artificial intelligence system to create derivative works, such as music, based on user prompts and themes from copyrighted content.

A method implementation may comprise: receiving a request to transform predetermined content using generative artificial intelligence, wherein the content is copyrighted and digitally controlled by a cloud-based authorization server; receiving a user request to create a derivative work using the generative artificial intelligence, wherein the request comprises a prompt from the user to cause the generative artificial intelligence to create the derivative work as a function of the predetermined content and a user specific theme for the derivative work; determining if the derivative work is approved for creation using AI modeling the content owner; and in response to determining the derivative work is approved, create the generative artificial intelligence derivative work and marking the work with a digital watermark for tracking use of the generative artificial intelligence derivative work, wherein the content is music.

An implementation in accordance with the present disclosure may provide solutions advantageous to management and control of derivative works.

In an illustrative example, an implementation may provide cloud-based authorization based on configuring a cloud-based authorization server to manage and control access to copyrighted content. This cloud-based authorization server may provide verification services for copyrighted content. For example, by contacting an authorization server, the system checks if the copyrighted content (e.g., a song, movie, book, other) that is to be transformed into a derivative work, or used by Generative AI is an actual copyright listed in the database. This may be achieved by accessing a database that maintains logs of all approved artists of many types who have approved copyrights in the server available for derivative creation. The server may contain the list of copyrights, as well as the related lists of themes and related options approved by the copyright owners, labels or managers for the derivative creation. The approval or non-approval may be controlled by the authorization server. When a derivative copyright license is created the ownership of the derivative rights may be split between the master copyright owner at some percentage level, and the AI user. Additional owners may be in the split as well depending on the situation.

In an illustrative example, an implementation may provide a user prompt system based on configuring an interface where users can submit requests and prompts for creating derivative works. For example, receiving a user request from a generative AI user (whether human or an AI Bot) may comprise the user submitting a request to a music label, motion picture company, book publisher, artist, author or other master copyright owner to create a derivative work based on their existing issued master copyright, or whereby the owner of the master recording, or master use rights have provided their approvals to use their copyrights. The existing issued master copyrights can be for music, motion pictures, books, names, images, likeness, brands or other copyrightable materials as approved by the US Copyright Office in the United States and related offices in other countries. The request may be to use Generative Artificial Intelligence (large language models), or in conjunction with an artificial intelligent system, AI software or AI applications. The authorization server can be managed by Music Labels, Artist Groups, Publishing Houses, Motion Picture Firms, Management firms, Licensing agencies or others. The owners will develop a relationship with the Generative AI firms to allow AI users to pay a fee to access the authorization server so that it can work either through the Generative AI interfaces or in conjunction with the Generative AI interfaces so that both the Companies that are managing the authorization servers have a business relationship with the Generative AI companies.

The request to create a derivative copyright may include a prompt that describes what the AI user wants to achieve when using the primary or master copyright to create the derivative work. A prompt system may interview the user who wants to make the derivative work. The user may answer numerous questions that ultimately specify the theme or style of the derivative works. After completing the questions by the authorization server, the request may be processed, and the authorization server will either approve or not approve the right to make the derivative work. In some cases, the authorization server may consider the exiting copyrights in the database, when determining whether to approve or not approve the request.

If the server authorizes the approval for the creation of the derivative works, the user may be required to pay a user creation fee, and sign a new license that outlines what copyright is being licensed, what copyrights are being conveyed, how the derivative copyrights can be used, any royalty amounts the user is required to pay to use the license, and the terms of any payments due, in the short term or in the long term and what are the requirements for payments to be made or not made, and how long the license is for.

An implementation in accordance with the present disclosure may advantageously enhance generative AI development based on implementing generative AI algorithms capable of creating derivative works created as a function of user inputs and pre-existing copyrighted content. For example, once the necessary approvals are in place, an implementation of the system may use generative AI to create the new derivative work based on the user's prompt and the pre-existing content. The derivative work is tailored to meet the user's specifications while ensuring compliance with the copyright owners pre-approved requirements, copyright law and the pre-negotiated derivative license. The system may allow a user to view and or listen to the newly created derivative work prior to paying a user fee, finalizing the license, signing the license, or paying an upfront royalty payment. If the User is not happy with the initial result of the derivative creation, they may try again to have the system create the derivative again so long as the same specifications are used.

An implementation in accordance with the present disclosure may verify whether a user has the necessary permissions to use the authorization server by ensuring all personal data is provided and they have registered themselves on the authorization server. The authorization server may require the ability to officially verify government issued identification or other means of official validation to ensure there is no fraud. If no permissions exist, the system will confirm to the AI user that they must register before creating a derivative work.

For the system to scale so that many AI users can obtain a license from the same Artists, Songs, Movies, Labels, Management, etc., the system may be configured to implement an approval process comprising AI modeling to create the derivative work. In an illustrative example, an implementation may maintain a detailed database of the perspective of the content or copyright owner to determine if the derivative work can be approved for creation. This modeling takes into account the owner s preferences on which copyrights can be used, how they can be used, where they can be used, why they can be used and so on.

An implementation in accordance with the present disclosure may be configured to integrate digital watermark technology with derivative work generation, ensuring that all derivative works are watermarked to track their use. For example, a created derivative work may be embedded with a digital watermark that helps track its usage, through AI Copyright Bots that track the derivative creation across the Internet and on other platforms that allow copyrighted materials to be heard, seen, etc. The watermark ensures that the derivative work can be monitored for licensing and copyright compliance and agreed to royalty payments throughout its lifecycle. The digital watermark may be embedded into the derivative copyright file that is ultimately downloaded by the User who created the derivative file. Once the final derivative file is created, the authorization server may electronically connect to the US Copyright Office and register the derivative copyright based on obtained information when the AI user answered questions. Additionally, this will assist the authorization server in gaining factual data from the AI user so that security and fraud issues are eliminated or cut down significantly, if any.

An implementation in accordance with the present disclosure may be configured to govern licensing and IP rights management, based on incorporating mechanisms for handling licensing agreements and enforcing IP rights. For example, an implementation may be configured to manage licensing agreements, based on negotiating and executing licensing agreements for the AI-generated derivative works. This ensures proper compensation and adherence to intellectual property (IP) rights.

Managing derivative licensing agreements electronically is an efficient way to streamline the entire process, ensuring compliance, proper tracking, and case of management. The Authorization platform may be configured with License Management Component for managing all derivative licensing agreements. This will ensure real-time updates allowing licensors and licensees to track status, usage, and compliance in real-time. The system can also have analytics and reporting offering insights into royalty payments, compliance risks, out of license issues, under payments, payments due, performance metrics, etc.

An implementation may be configured to use blockchain for smart contracts ensuring decentralized verification where the blockchain can automatically verify and execute agreements without intermediaries, reducing disputes and enforcing compliance. Additionally, such a blockchain implementation would advantageously provide a permanent and transparent ledger of the agreement which is ideal for large volume derivative creations with high licensing volumes. This can enable automated payments whereby smart contracts are used and they can trigger payments when conditions of the license are met, or when usage outside the license triggers payments that are due.

An implementation may be configured with royalty management services wherein there will be automated royalty calculations and then distributes royalties based on usage or sales data to those who own the master and the percentage owners of the derivative copyright(s). There can be multiple licensing models such as flat fees, usage-based, or tiered structures among others. There will also be revenue tracking via monitoring of the performance of licensed derivatives and tracks revenue generated from each agreement. The platform may also utilize multi-language support providing AI users from around the world with multilingual licensing interfaces for easy management across regions. An Authorization server implementation may be configured to analyze the developed licensing agreements right at the conclusion of development for risks, errors, or non-compliant terms prior to have electronic signatures. The AI system can automatically review and compare licensing terms with a set of predetermined compliance rules. The system may be configured to allow the system owners to track licensing agreements as part of a broader intellectual property strategy, ensuring protection of IP assets.

An implementation in accordance with the present disclosure may advantageously provide a royalty tracking and payment system implemented to calculate and distribute royalties based on usage tracking data. For example, an implementation may track usage and manage IP rights using technology such as but not limited to digital watermarking tracking bots, servers and other related technologies. Such digital watermarking tracking bots, servers and other related technologies continue to monitor the usage, playing, streaming, listening, viewing of the derivative work, ensuring that it complies with licensing agreements. This includes tracking where, when, how many times, and by whom the derivative work is used. When the tracking bot identifies the derivative copyright playing on a platform, the bot is able to work with the platform to identify the number of streams or plays the copyrights have played and because of the platform that the derivative is being played on, the amount of funds made by the derivative will be known whereby licensing payments will need to be paid to the original copyright owner based on the pre-agreed to amounts. If a tracking bot identifies a derivative copyright that is not following its approved license, the tracking bot can communicate with the authorization server providing updates to the authorization server allowing security or fraud systems to automatically mail cease and desist letters, demand letters for payments, or cancel the derivative work and eliminate the ability for the derivative copyright to be played, listened to or similar.

Based on the usage data collected, the system may be configured to facilitate automatic calculation and distribution of royalties to artists, copyright holders, and other stakeholders involved in the creation of the original and derivative works. By using licensing tracking technologies, internal bots, other technologies and agreed upon statistics from partnership platforms; the system may track amounts owed to the copyright owners, as well as any revenue splits or percentage splits related to the derivative works. In some cases, the owners of the authorization server and licensing technologies may allow the Generative AI platform to have some ownership in the derivative works so that in addition to initial usage fees the generative AI platforms or other AI software and applications may receive royalties as approved by the company that owns or manages the licensing technology that approves the derivative copyrights for creation.

In an exemplary implementation, the disclosed method may begin with the reception of predetermined content, which is facilitated by a database server. This content may include various forms such as music, and is received as a multimodal predetermined content stream. The processor then splits this stream into discrete content streams, which may include audio, image, or text streams. Each discrete stream is transformed into a shared latent space representation using a modality-specific encoder.

The method further involves receiving a request to transform the predetermined content into a derivative work. This request is processed through a content derivation platform that includes at least one processor. The user can direct this platform via a network cloud to initiate the transformation process. The request includes a user-specific theme for the derivative work, which is received as text input through a prompt system. This system may include a chatbot configured to interview the user to obtain the requested theme.

The requested theme is converted into a text embedding within the shared latent space. The processor finds embeddings of the predetermined content that align with this text embedding. Using generative artificial intelligence, specifically a diffusion model, the processor transforms these aligned embeddings into new content that aligns with the user's requested theme. This transformation results in a derivative work that may comprise audio, video, or images.

Access to approved derivative works is controlled by an authorization server using a derivative work server that stores these works with time-sensitive watermarks. These watermarks can be updated periodically and are valid for limited periods of time. The authorization server can revoke or not renew approval for a derivative work by allowing its watermark to expire.

The method concludes by providing user access to the authorized derivative work via platforms such as mobile applications hosted on mobile devices. These applications can direct the content derivation platform to create derivative works from predetermined content stored on servers dedicated to such tasks.

An implementation may leverage advanced AI models like diffusion models and CLIP implementations for generating and approving derivative works based on user-specific themes while ensuring compliance through digital watermarking and authorization protocols.

This cataloging process could include tagging the content with metadata that describes its attributes, such as genre, length, and target audience. The metadata can be used to facilitate efficient retrieval and processing of the content when a request for transformation is received.

Upon receiving a request to transform the predetermined content, the content derivation platform may employ a user interface that allows users to specify additional parameters for the derivative work. These parameters could include the desired format of the derivative work, such as text, audio, video, or interactive media. Users might also specify the intended platform for distribution, such as social media, streaming services, or print.

The requested theme for the derivative work could be selected from a predefined list of themes stored in the database server, or it could be a custom theme input by the user. The generative artificial intelligence may utilize natural language processing to interpret the theme and align it with the predetermined content. For example, if the predetermined content is a historical text and the requested theme is "science fiction," the AI might generate a narrative that reimagines historical events with futuristic technology.

In creating the derivative work, the generative AI could employ various techniques such as style transfer, where the stylistic elements of the requested theme are applied to the predetermined content. Alternatively, the AI might use a narrative generation model that constructs new storylines or dialogues based on the theme. The AI could also incorporate multimedia elements, such as generating background music or visual effects that complement the theme.

The content approval machine learning model may be trained on a dataset of previously approved and rejected derivative works, allowing it to learn patterns that align with content owner preferences. The model could consider factors such as thematic consistency, originality, and adherence to content guidelines. The content approval score might be a composite score derived from multiple sub-scores, each representing a different aspect of the content owner's preferences.

If the content approval score meets or exceeds the predetermined minimum, the digital watermark applied to the approved derivative work could include information such as the content owner's identity, the date of approval, and usage rights. The digital watermark might be visible, such as a logo or text overlay, or invisible, such as a digital signature embedded within the file.

The authorization server could be configured to enforce usage rights by tracking the distribution and access of the derivative work. It might employ blockchain technology to create an immutable record of transactions involving the derivative work. Alternatively, the server could use access control lists to restrict usage to authorized users or platforms.

Providing access to the approved derivative work could involve generating a unique access token that users must present to download or view the work. The access token might be time-limited or usage-limited, ensuring that the derivative work is only accessible under the conditions specified by the content owner. Additionally, the method could include generating analytics reports that provide insights into how the derivative work is being accessed and used, allowing content owners to make informed decisions about future content transformations.

A requested theme could be a modern jazz interpretation. The generative artificial intelligence could then analyze the original symphony's structure and apply jazz elements like swing rhythm, improvisational solos, and syncopated beats. The processor might adjust the tempo to a more relaxed pace typical of jazz, while reimagining the orchestration to include instruments like saxophones and trumpets.

Alternatively, the music content could be a pop song, and the requested theme might be a classical orchestral version. In this scenario, the generative AI could transform the pop song's melody and harmony into a symphonic arrangement, incorporating strings, woodwinds, and brass sections. The processor might also adjust the dynamics and articulation to reflect the grandeur of a classical performance.

In another example, the content could be a traditional folk song, and the requested theme might be an electronic dance music (EDM) remix. The generative AI could infuse the folk melody with electronic beats, synthesizers, and bass drops, creating a high-energy track suitable for dance floors. The processor might also introduce effects like reverb and delay to enhance the electronic feel.

The content approval machine learning model could be trained on a diverse dataset of music preferences, allowing it to evaluate the transformed work's alignment with the content owner's taste. For instance, if the content owner prefers a certain genre or style, the model could assign a higher content approval score to derivative works that closely match these preferences.

If the derivative work receives an approval score above the predetermined minimum, a digital watermark could be applied. This watermark might include metadata such as the transformation date, the original content's details, and the transformation parameters. The authorization server could then use this watermark to manage licensing and distribution rights, ensuring that the derivative work is used in accordance with the content owner's stipulations.

Access to the approved derivative work could be provided through various channels, such as streaming platforms, digital downloads, or physical media. The method could also allow for customization of access rights, enabling the content owner to specify conditions like geographical restrictions or time-limited availability.

The method, as described above, may comprise receiving content. The content in question may comprise audio. The audio content can be in various formats such as MP3, WAV, or AAC, and may originate from diverse sources like music tracks, podcasts, or audiobooks. Upon receiving the audio content, the system may employ audio analysis techniques to extract features such as tempo, pitch, and rhythm. These features can be used to inform the transformation process.

For instance, if the request is to transform a music track into a derivative work with a jazz theme, the system might adjust the tempo and introduce elements like swing rhythm or jazz chord progressions. Alternatively, if the requested theme is cinematic, the system could enhance the audio with orchestral elements or dramatic crescendos.

The generative artificial intelligence may utilize neural networks trained on vast datasets of audio samples to generate the derivative work. This AI could be designed to recognize patterns and styles within the audio content, allowing it to seamlessly integrate new thematic elements while maintaining the integrity of the original piece.

In another example, if the audio content is a podcast, the derivative work might involve altering the tone or style to fit a requested theme such as "mystery" or "comedy." This could involve modifying the background music, adding sound effects, or even altering the voice modulation of the speakers to match the desired theme.

As an alternative, the system could offer a feature where users can select specific segments of the audio content to be transformed, allowing for more targeted derivative works.

For instance, a user might choose to apply a requested theme only to the chorus of a song or a particular chapter of an audiobook.

The content approval machine learning model may be trained to evaluate the transformed audio based on various criteria such as audio quality, thematic consistency, and adherence to content owner preferences. This model could be fine-tuned using feedback from content owners to improve its accuracy over time. Once the derivative work is approved, the digital watermark applied could include metadata such as the transformation date, the requested theme, and the content owner s information. This watermark could be embedded in the audio file in a way that is inaudible to listeners but detectable by software, ensuring the integrity and traceability of the derivative work.

The authorization server might be configured to manage permissions for the derivative work, allowing content owners to specify conditions under which the work can be accessed or distributed. This could include setting geographical restrictions, usage limits, or licensing terms. Access to the approved derivative work could be provided through various channels, such as streaming platforms, download links, or integration with third-party applications. Users might have the option to preview the derivative work before finalizing their access, ensuring satisfaction with the transformation.

The method, as described above, further may comprise an audio element. This audio element additionally may comprise a human voice sound. The audio element can be integrated in various ways, offering a range of possibilities for enhancing the derivative work. For instance, the audio element may be synchronized with visual content to create a multimedia experience. This synchronization can be achieved by aligning the timing of the audio with specific visual cues or transitions within the derivative work.

A specific example of this could involve a derivative work that is a video montage. The audio element might include a human voice sound that narrates the content, providing context or storytelling that complements the visual elements. The human voice sound could be generated using text-to-speech technology, which allows for the creation of a variety of voice profiles, including different accents, tones, and emotional expressions. This flexibility enables the derivative work to cater to diverse audience preferences or to align with the requested theme more closely. Alternatively, the audio element could be a musical score or sound effects that enhance the mood or atmosphere of the derivative work. For instance, a derivative work with a requested theme of "mystery" might include a suspenseful musical score that builds tension, while sound effects such as footsteps or whispers could be layered to add depth to the experience.

In another scenario, the audio element might be interactive, allowing users to engage with the derivative work in a dynamic way. For example, the human voice sound could be part of an interactive audio guide that responds to user inputs or choices, providing a personalized experience. This could be particularly useful in educational or training contexts, where the audio element serves as a virtual instructor or guide. As an alternative, the audio element could be designed to be adaptive, changing in response to user interactions or environmental factors. For instance, the volume, pitch, or tempo of the human voice sound could adjust based on the user's location, time of day, or even biometric data such as heart rate, creating a truly immersive and personalized experience.

Moreover, the audio element could be used to convey additional information or metadata about the derivative work. For example, a human voice sound could provide commentary or insights about the creation process, the significance of certain elements, or the intended message of the work. This could be particularly valuable in artistic or cultural contexts, where understanding the creator's perspective enhances the appreciation of the work.

In terms of alternatives, the audio element might not be limited to a single human voice sound. It could involve multiple voices, creating a dialogue or conversation that adds complexity and richness to the derivative work. These voices could represent different characters, perspectives, or narrative threads, offering a multi-layered experience that engages the audience on multiple levels.

The method, as described above, further may comprise the step of detecting the human voice. The detection of the human voice is based on a technique that may comprise autocorrelation. The at least one processor is utilized in this technique.

Autocorrelation, as mentioned, is one approach, but it can be complemented or substituted with other methods such as spectral analysis, machine learning-based voice recognition, or neural network models specifically trained for voice detection.

For instance, spectral analysis could involve breaking down the audio signal into its constituent frequencies and identifying patterns that are characteristic of human speech. This could be particularly useful in environments with significant background noise, where distinguishing human voice from other sounds is challenging.

Alternatively, a machine learning-based approach might involve training a model on a large dataset of human voices, allowing it to learn the nuances and variations in speech patterns. This model could then be deployed to detect human voice in real-time, adapting to different accents, languages, and even emotional tones.

Neural networks, particularly convolutional neural networks (CNNs) or recurrent neural networks (RNNs), could be employed to enhance voice detection accuracy. These networks could be trained to recognize not only the presence of a human voice but also specific characteristics such as pitch, speed, and intonation, which could be useful in applications like sentiment analysis or speaker identification.

In terms of practical applications, this voice detection capability could be integrated into a variety of systems. For example, in a smart home environment, the system could detect voice commands to control appliances or adjust settings. In a customer service setting, it could be used to transcribe and analyze customer interactions for quality assurance or training purposes.

As an alternative, the system could be designed to detect specific keywords or phrases, triggering certain actions or responses. This could be useful in security systems, where detecting a distress word could automatically alert authorities or initiate a lockdown procedure.

Moreover, the voice detection system could be configured to work in tandem with other sensors, such as cameras or motion detectors, to provide a more comprehensive understanding of the environment. For example, in a retail setting, detecting a customer's voice in conjunction with their movement patterns could provide insights into shopping behavior and preferences.

In terms of customization, users could be given the option to adjust the sensitivity of the voice detection system, allowing it to be tailored to specific environments or use cases. This could involve setting thresholds for voice detection, choosing which frequencies to prioritize, or selecting specific languages or dialects to focus on. The method, as described above, further may comprise the step of frequency domain autocorrelation. This frequency domain autocorrelation is performed using the at least one processor.

One approach involves transforming the predetermined content into the frequency domain using a Fast Fourier Transform (FFT). This transformation allows for the analysis of frequency components, which can be particularly useful in identifying patterns or repetitive elements within the content. Once in the frequency domain, autocorrelation can be performed by multiplying the frequency domain representation of the content by its complex conjugate. This operation highlights periodicities and can be used to enhance or suppress certain features in the derivative work. For instance, if the predetermined content is an audio file, frequency domain autocorrelation can help isolate specific musical notes or rhythms, which can then be emphasized or altered according to the requested theme.

Alternatively, frequency domain autocorrelation can be applied to visual content, such as images or videos. In this context, the method might involve analyzing the frequency components of pixel intensity variations. By identifying repeating patterns or textures, the method can adjust these elements to align with the requested theme, such as creating a derivative work with a vintage or futuristic aesthetic.

In another example, frequency domain autocorrelation could be used in the context of text-based content. Here, the method might involve converting text into a numerical representation, such as through word embeddings, and then applying frequency domain analysis to detect recurring themes or sentiments. This information can guide the generative artificial intelligence in crafting a derivative work that maintains the essence of the original content while incorporating the requested theme.

As an alternative, the method could employ a sliding window approach in the frequency domain, where autocorrelation is calculated over successive segments of the content. This technique allows for the detection of localized patterns, which can be particularly useful in creating derivative works that require a high degree of detail or precision. Moreover, the method might include the use of adaptive filtering techniques in conjunction with frequency domain autocorrelation. By dynamically adjusting the filter parameters based on the autocorrelation results, the method can fine-tune the emphasis on specific frequency components, ensuring that the derivative work aligns closely with the requested theme.

In some embodiments, the method could incorporate machine learning algorithms to optimize the frequency domain autocorrelation process. By training a model on a dataset of successful derivative works, the method can learn to predict the most effective autocorrelation parameters for different types of content and themes, thereby enhancing the quality and relevance of the generated derivative work.

The method, as described above, further may comprise an audio element. This audio element additionally may comprise a sound produced by a musical instrument. For instance, the sound produced by a musical instrument may be recorded in a studio setting, ensuring high-quality audio capture. This sound can then be digitally processed to match the requested theme of the derivative work. For example, if the theme is "nostalgia," the sound could be processed to include effects such as reverb or vinyl crackle to evoke a sense of the past. Alternatively, the sound could be synthesized using digital audio workstations (DAWs) to create a unique audio signature that complements the visual or textual elements of the derivative work. This synthesized sound might involve layering multiple instrument sounds, such as combining a piano melody with a subtle string accompaniment, to create a rich auditory experience.

In another example, the audio element could be interactive, allowing users to manipulate the sound in real-time. This could be achieved through a user interface that lets users adjust parameters like tempo, pitch, or volume, thereby personalizing the audio experience to their preferences. Moreover, the audio element might be dynamically generated using generative artificial intelligence. This approach could involve training a machine learning model on a dataset of musical compositions to produce new, original sounds that align with the requested theme. The AI-generated audio could then be seamlessly integrated into the derivative work, providing a novel auditory dimension. Additionally, the audio element might include ambient sounds or soundscapes that enhance the immersive quality of the derivative work. For instance, a theme centered around nature could incorporate sounds of birds chirping or a gentle stream, creating a more engaging and atmospheric experience for the audience. In terms of alternatives, the audio element could be optional, allowing creators to decide whether or not to include it based on the nature of the derivative work. This flexibility ensures that the method can accommodate a wide range of creative projects, from silent visual art pieces to multimedia presentations with complex soundtracks.

The method, as described above, determines the requested theme based on an interview with a user. The determination of the requested theme is carried out using the at least one processor. The interview may be conducted using a virtual assistant powered by natural language processing algorithms. This virtual assistant could engage the user in a conversational manner, asking a series of questions designed to elicit preferences, interests, and desired outcomes for the derivative work. For instance, the virtual assistant might ask the user about their favorite genres, color schemes, or emotional tones they wish to convey in the derivative work. Alternatively, the interview process could be facilitated through a graphical user interface (GUI) that presents the user with a series of visual and textual prompts. These prompts might include sliders, checkboxes, or dropdown menus that allow the user to select or rate various thematic elements. For example, the user could be presented with a color palette and asked to choose their preferred colors, or they might be shown a series of images and asked to select those that resonate with the mood they wish to achieve. In another variation, the interview could be conducted through a collaborative platform where multiple users contribute to the theme determination process. This platform might allow users to vote on different thematic elements or to provide feedback on each other's suggestions. This collaborative approach could be particularly useful in scenarios where the derivative work is intended for a group or community.

The interview process could also incorporate machine learning algorithms that analyze the user's responses in real-time to refine and suggest themes that align with the user's preferences. These algorithms might draw on a database of past user interactions to identify patterns and make recommendations. For example, if a user frequently selects themes related to nature, the system might suggest a theme that incorporates natural elements even if the user does not explicitly mention them during the interview. Additionally, the interview could be augmented with biometric feedback, such as tracking the user's eye movements or measuring their physiological responses to different stimuli. This data could provide insights into the user's subconscious preferences, allowing the system to propose themes that the user might not have consciously considered. In terms of alternatives, the interview could be bypassed entirely in favor of an automated theme suggestion system. This system might analyze the predetermined content itself to identify potential themes based on its characteristics. For instance, if the content includes a significant amount of text, natural language processing techniques could be used to extract keywords and suggest themes that align with the content's subject matter.

The method, as described above, involves an interview with the user. The interview is performed by a chatbot. The chatbot utilizes the at least one processor for this operation. The chatbot, leveraging natural language processing capabilities, can engage the user in a conversational manner to gather detailed insights about their preferences, intentions, and specific requirements for the derivative work. For instance, the chatbot might begin by asking open-ended questions to understand the user's vision for the derivative work. It could inquire about the desired tone, style, or any particular elements the user wishes to emphasize. The chatbot could also present multiple-choice questions or sliders to gauge the user's preferences on a spectrum, such as the level of creativity versus adherence to the original content. In a specific example, if the predetermined content is a piece of music, the chatbot might ask the user whether they prefer a classical or modern reinterpretation, or if they want to incorporate specific instruments or themes. The chatbot could also suggest various themes based on the user's initial responses, offering options like "romantic," "adventurous," or "mysterious," and allow the user to select or refine these suggestions.

Alternatively, the chatbot could employ sentiment analysis to detect the user's emotional state or enthusiasm about certain ideas, adjusting its questions and suggestions accordingly. This adaptive approach ensures that the interview process is tailored to the user's unique preferences and can lead to a more personalized derivative work. Moreover, the chatbot could be designed to handle multiple languages, allowing users from different linguistic backgrounds to interact with it comfortably. It could also offer accessibility features, such as voice input and output, to accommodate users with different needs. In another variation, the chatbot might integrate with external data sources or social media platforms to gather additional context about the user's interests and preferences, further enriching the interview process. This integration could help the chatbot propose derivative work ideas that align with current trends or the user's past interactions and expressed interests. The chatbot could also provide real-time feedback and previews of potential derivative work concepts during the interview, allowing the user to iteratively refine their input and see immediate results. This interactive feedback loop can enhance user engagement and satisfaction with the final derivative work.

The method, as described above, determines the requested theme based on a specific process. This process involves matching a response from the user with a semantically similar predetermined theme. The predetermined theme is identified by a Large Language Model (LLM). The identification of the predetermined theme by the LLM is a function of the response from the user. The method utilizes at least one processor for this identification and matching process. This response is then processed by a Large Language Model (LLM) that has been trained on a diverse dataset to understand and interpret various forms of input. The LLM analyzes the semantic content of the user's response, breaking it down into key concepts and themes. For instance, if a user inputs a text response describing a serene landscape with mountains and a lake, the LLM might identify themes such as "nature," "tranquility," or "outdoor scenery." The LLM then searches its database of predetermined themes, which could include a wide array of categories like "urban," "historical," "futuristic," or "abstract," to find a match that is semantically similar to the identified themes from the user's response.

The matching process involves calculating a similarity score between the user's response and each predetermined theme. This could be achieved using techniques such as cosine similarity or other vector-based approaches that measure the distance between the semantic vectors of the user's response and the themes. The theme with the highest similarity score is selected as the requested theme. In an alternative approach, the LLM might employ a clustering algorithm to group similar themes together, allowing for a more nuanced selection process. For example, if the user's response is ambiguous or contains multiple potential themes, the LLM could assign a probability to each theme cluster and select the one with the highest likelihood. Once the requested theme is determined, the system can offer the user options to refine or adjust the theme selection. This could involve presenting a list of related themes or subthemes, allowing the user to make a more precise choice. For example, if the initial theme is "nature," the user might refine it to "tropical rainforest" or "alpine meadow." Additionally, the system could incorporate user feedback to improve the theme matching process over time. By analyzing which themes users frequently select or adjust, the LLM can learn to make more accurate initial theme suggestions in future interactions.

In another variation, the system might allow for collaborative theme determination, where multiple users can contribute responses that are collectively analyzed to determine a consensus theme. This could be particularly useful in scenarios where the derivative work is intended for a group or community project. In the method as described above, the predetermined theme is pre-approved by the content owner. This pre-approval can be facilitated through a user interface that allows content owners to select from a variety of themes. These themes could range from stylistic elements such as color palettes, artistic styles, or narrative tones, to more specific thematic elements like genre or mood. For instance, a content owner might pre-approve a theme that aligns with a specific brand identity, ensuring that any derivative works maintain a consistent look and feel. This could involve selecting a theme that uses a particular color scheme or font style that is synonymous with the brand. Alternatively, a content owner might choose a theme that reflects a particular narrative style, such as a comedic or dramatic tone, to ensure that the derivative work aligns with the intended audience's expectations.

In another example, a content owner might pre-approve a theme that is seasonal or event-specific, such as a holiday theme or a theme related to a particular marketing campaign. This allows for the creation of derivative works that are timely and relevant, potentially increasing engagement with the target audience. The pre-approval process could also involve setting parameters for the generative artificial intelligence to follow, such as limiting the use of certain elements or prioritizing others. For example, a content owner might specify that a derivative work should not include certain imagery or language, or that it should emphasize particular aspects of the original content. As an alternative, the pre-approval could be dynamic, allowing content owners to update or change the approved themes based on real-time feedback or changing market conditions. This could be facilitated through a dashboard that provides analytics on the performance of derivative works, enabling content owners to make informed decisions about which themes to approve or modify. Moreover, the pre-approval process could be automated to some extent, using machine learning algorithms to suggest themes based on historical data or trends. This could streamline the process for content owners, providing them with recommendations that are likely to resonate with their audience. In terms of implementation, the pre-approval of themes could be integrated into the content derivation platform, allowing for seamless selection and application of themes during the derivative work creation process. This integration could be achieved through APIs or other software interfaces that connect the theme selection module with the generative artificial intelligence and content approval systems.

The method, as described above, may comprise a generative artificial intelligence. The generative artificial intelligence further may comprise a diffusion model. This model operates by gradually transforming a simple initial state into a complex final state that aligns with the requested theme. For instance, the initial state could be a basic noise pattern or a rudimentary sketch, which the diffusion model progressively refines by adding layers of detail and complexity, guided by the predetermined content and the requested theme. In one example, the diffusion model might start with a grayscale image representing the basic structure of the derivative work. Over successive iterations, the model could introduce color gradients, textures, and intricate patterns that reflect the nuances of the requested theme. This iterative process allows for the creation of highly detailed and thematically consistent derivative works. Alternatively, the diffusion model could be configured to work with textual content. In this scenario, the model might begin with a simple outline or a set of key phrases. Through a series of transformations, it could expand these into a fully fleshed-out narrative or a detailed descriptive passage, ensuring that the final text embodies the essence of the requested theme.

The diffusion model's flexibility allows for various configurations. For example, it could be adjusted to prioritize certain aspects of the theme, such as color schemes in visual works or tone and style in textual content. This adaptability ensures that the derivative work not only meets the thematic requirements but also aligns with specific aesthetic or stylistic preferences. In another embodiment, the diffusion model could incorporate feedback loops where intermediate versions of the derivative work are evaluated against the content approval machine learning model. This iterative feedback could guide the diffusion process, ensuring that the evolving work remains within acceptable parameters and increases the likelihood of approval. Moreover, the diffusion model could be integrated with other generative models, such as GANs (Generative Adversarial Networks), to enhance its capabilities. This integration might involve using GANs to generate initial content variations, which the diffusion model then refines. Such a hybrid approach could leverage the strengths of both models, resulting in more robust and versatile derivative works.

In terms of alternatives, the diffusion model could be replaced or supplemented with other generative techniques, such as variational autoencoders or transformer-based models, depending on the specific requirements of the derivative work. Each of these models offers unique advantages, such as improved handling of specific data types or enhanced scalability, which could be beneficial in different contexts.

In the method as described above, the diffusion model employed is a latent diffusion model. One approach involves utilizing a multi-layered neural network architecture that processes the predetermined content through a series of transformations. Each layer of the network can be designed to extract different features or patterns from the content, which are then used to inform the generation of the derivative work. For instance, the initial layers might focus on identifying basic shapes or structures, while subsequent layers could refine these into more complex forms or themes. An alternative implementation could involve a hybrid model that combines latent diffusion with other generative techniques, such as variational autoencoders or generative adversarial networks. This hybrid approach might allow for more nuanced control over the stylistic elements of the derivative work, enabling the system to better align with the requested theme. For example, the latent diffusion model could be used to establish the foundational structure of the work, while a generative adversarial network could fine-tune the aesthetic details to match the desired theme.

In another example, the latent diffusion model could be configured to operate in a feedback loop with the content approval machine learning model. This setup would allow the system to iteratively refine the derivative work based on real-time feedback regarding its content approval score. As the work is adjusted, the latent diffusion model could explore different pathways or variations, potentially leading to a more optimized or innovative final product. Additionally, the latent diffusion model could be adapted to incorporate user input or preferences directly into the generation process. Users might be able to specify certain parameters or constraints that the model should consider, such as color schemes, stylistic influences, or thematic elements. This customization could be achieved through an interactive interface that allows users to adjust sliders or select options, with the latent diffusion model dynamically updating the derivative work in response. Moreover, the latent diffusion model could be employed in a distributed computing environment, where different components of the model are processed across multiple devices or servers. This distributed approach might enhance the efficiency and scalability of the system, allowing it to handle larger volumes of content or more complex derivative works. For instance, one server could manage the initial feature extraction, while another focuses on theme integration, and a third refines the final output. Finally, the latent diffusion model could be integrated with external data sources or APIs to enrich the derivative work with additional context or information. This integration might involve pulling in relevant data from online databases, social media platforms, or other digital repositories, which the model could then incorporate into the creative process. Such an approach could lead to derivative works that are not only thematically aligned but also contextually relevant and informed by current trends or events.

The method, as described above, further may comprise the step of encoding the content to a latent space. This encoding process is carried out using an encoder network. This transformation is achieved through an encoder network, which can be implemented using various neural network architectures such as convolutional neural networks (CNNs), recurrent neural networks (RNNs), or transformer models, depending on the nature of the content. For instance, if the predetermined content is an image, a CNN might be employed to extract spatial hierarchies of features, reducing the image to a latent vector that encapsulates its core attributes. Alternatively, if the content is text-based, an RNN or a transformer model could be used to capture the sequential and contextual information, encoding the text into a latent space that reflects its semantic meaning. Once encoded, the latent space representation serves as a versatile foundation for generating derivative works. This representation can be manipulated to explore variations or to align with the requested theme. For example, in the case of image content, the latent vector might be adjusted to alter color schemes, introduce stylistic elements, or modify compositional aspects, all while maintaining the integrity of the original content.

In another scenario, if the content is audio, the encoder network might utilize a spectrogram-based approach to convert the audio signals into a latent space. This allows for the generation of derivative audio works that can vary in tempo, pitch, or even genre, depending on the requested theme. Alternatives to the encoder network could include autoencoders, which consist of both an encoder and a decoder. The autoencoder would compress the content into a latent space and then reconstruct it, ensuring that the latent representation is robust and retains the necessary information for generating high-quality derivative works. Moreover, the latent space encoding can facilitate the application of style transfer techniques, where the stylistic elements of one piece of content are applied to another. This is particularly useful in creating derivative works that blend multiple themes or artistic styles. In addition, the latent space can be leveraged for content interpolation, where two or more pieces of content are encoded, and their latent representations are combined to produce a new, hybrid derivative work. This approach can be used to create novel content that inherits characteristics from multiple sources, offering a rich avenue for creative exploration.

The method, as described above, further may comprise an encoder network. The encoder network also may comprise a convolutional neural network (CNN). The CNN is configured to extract mel-frequency cepstral coefficients (MFCCs) from the content. For instance, the CNN could be structured with multiple convolutional layers, each followed by activation functions such as ReLU (Rectified Linear Unit) to introduce non-linearity. These layers may be interspersed with pooling layers, such as max pooling or average pooling, to reduce dimensionality and computational load while retaining essential features. In one embodiment, the CNN may be designed to handle inputs of varying lengths by employing a global average pooling layer towards the end of the network. This layer can aggregate features across the entire input, allowing the network to produce a fixed-size output regardless of the input size. This approach can be particularly useful in scenarios where the content length is unpredictable. The extraction of mel-frequency cepstral coefficients (MFCCs) can be further refined by incorporating pre-processing steps such as noise reduction or normalization. For example, a noise reduction algorithm, like spectral subtraction, could be applied to the input content before it is fed into the CNN. This pre-processing step may help in enhancing the quality of the extracted MFCCs, especially in noisy environments.

Moreover, the encoder network might include additional feature extraction techniques alongside MFCCs. For instance, it could extract chroma features, which represent the energy distribution across different pitch classes, or spectral contrast, which measures the difference in amplitude between peaks and valleys in the sound spectrum. These additional features could be concatenated with the MFCCs to form a comprehensive feature vector that provides a richer representation of the content.

In another variation, the encoder network could be augmented with a recurrent neural network (RNN) layer, such as a Long Short-Term Memory (LSTM) or Gated Recurrent Unit (GRU), to capture temporal dependencies in the content. This addition could be beneficial for applications involving sequential data, where understanding the order and timing of features is important. The encoder network may also be designed to be adaptive, allowing it to fine-tune its parameters based on feedback from a downstream task. For instance, it could be part of a larger system that includes a decoder network, and the encoder's parameters could be updated through backpropagation based on the performance of the entire system. In terms of alternatives, the CNN could be replaced or supplemented with a transformer-based architecture, which has gained popularity for its ability to model long-range dependencies and parallelize computations. A transformer encoder could be used to process the content and extract features, potentially offering advantages in terms of scalability and performance. Furthermore, the encoder network could be implemented on various hardware platforms, ranging from high-performance GPUs for real-time processing to more resource-constrained environments like mobile devices or edge computing platforms. In such cases, techniques like model quantization or pruning could be employed to reduce the model size and computational requirements without significantly impacting performance.

The method, as described above, further may comprise using an encoder network. The encoder network additionally may comprise a Convolutional Neural Network (CNN). The CNN is configured to extract either a spatial or a temporal feature from the content. The CNN may consist of multiple layers, including convolutional layers, pooling layers, and fully connected layers, each serving a distinct purpose in feature extraction. For instance, in the context of image processing, the CNN might begin with a series of convolutional layers that apply different filters to the input image. These filters could be designed to detect edges, textures, or specific patterns within the image. The output of these convolutional layers may then be passed through pooling layers, which could perform operations such as max pooling or average pooling to reduce the spatial dimensions of the data while retaining the most significant features. In scenarios where temporal features are of interest, such as video analysis, the CNN might be configured to process sequences of frames. This could involve using 3D convolutional layers that operate across both spatial and temporal dimensions, allowing the network to capture motion patterns and changes over time.

Alternatively, the CNN could be combined with recurrent layers, such as Long Short-Term Memory (LSTM) units, to better handle temporal dependencies and sequence information. The encoder network might also incorporate various activation functions, such as ReLU (Rectified Linear Unit), sigmoid, or tanh, to introduce non-linearity into the model and enhance its ability to learn complex patterns. Batch normalization layers could be included to stabilize the learning process and improve convergence speed. In terms of specific worked examples, consider a CNN designed for facial recognition. The network could be trained on a dataset of labeled facial images, learning to extract features such as the distance between eyes, the shape of the nose, or the contour of the jawline. These features could then be used to identify or verify individuals in new images. Alternatively, for a video classification task, the CNN might be trained on a dataset of labeled video clips, learning to recognize actions or events, such as running, jumping, or waving. The network could extract both spatial features, like the appearance of objects in the scene, and temporal features, like the movement of those objects over time. As an alternative embodiment, the encoder network could be designed to handle audio data. In this case, the input might be a spectrogram representation of an audio signal, and the CNN could be configured to extract features related to pitch, rhythm, or timbre. This could be useful in applications such as music genre classification or speech recognition.

The encoder network could also be adapted to work with multimodal data, where it processes inputs from different sources simultaneously. For example, in an autonomous driving system, the network might receive both visual data from cameras and lidar data, extracting features that help the vehicle understand its environment and make driving decisions. In another variation, the CNN could be implemented on specialized hardware, such as a Graphics Processing Unit (GPU) or a Field-Programmable Gate Array (FPGA), to accelerate the computation and enable real-time processing of high-dimensional data. This could be particularly beneficial in applications requiring low latency, such as live video streaming or interactive gaming. The method, as described above, further may comprise an encoder network. The encoder network additionally may comprise a recurrent neural network (RNN) or a transformer. The RNN or the transformer is configured to extract a word embedding from the content. For instance, when utilizing a recurrent neural network (RNN), the network may be structured to include long short-term memory (LSTM) units or gated recurrent units (GRUs). These units are adept at handling sequences of data, making them particularly useful for tasks involving time-series data or natural language processing where the order of information is paramount. An LSTM, for example, can be configured with multiple layers, each layer having a different number of units to capture varying levels of abstraction in the data.

Alternatively, the encoder network may employ a transformer architecture, which is known for its ability to handle long-range dependencies in data through mechanisms such as self-attention. The transformer can be designed with multiple attention heads, each focusing on different parts of the input sequence, thereby allowing the network to learn complex relationships within the data. The transformer may also include positional encoding to retain the order of the input sequence, which is for tasks like language translation or sentiment analysis. In a specific example, the encoder network could be applied to a text classification task. Here, the input text is first tokenized into individual words or sub-words, which are then converted into numerical representations using a pre-trained word embedding model such as Word2Vec or GloVe. These embeddings serve as the input to the RNN or transformer. The RNN, if used, processes the sequence of embeddings one at a time, updating its hidden state at each step to capture the context of the text. In contrast, the transformer processes the entire sequence simultaneously, using its attention mechanism to weigh the importance of each word in the context of the entire sequence.

As an alternative, the encoder network could be adapted for use in a speech recognition system. In this scenario, the input would be a sequence of audio features, such as Mel-frequency cepstral coefficients (MFCCs), extracted from the audio signal. The RNN or transformer would then process these features to generate a sequence of embeddings that represent the phonetic content of the speech. These embeddings could be further processed by a decoder network to generate the corresponding text transcription. Moreover, the encoder network could be integrated into a larger system for image captioning. Here, the input would be an image, which is first processed by a convolutional neural network (CNN) to extract visual features. These features are then fed into the RNN or transformer, which generates a sequence of word embeddings that describe the content of the image. The network could be trained using a dataset of images paired with descriptive captions, allowing it to learn the associations between visual features and language.

In another variation, the encoder network might be employed in a recommendation system. The input could be user interaction data, such as clickstreams or purchase history, which is converted into a sequence of embeddings representing user preferences. The RNN or transformer processes this sequence to generate a user profile embedding, which can be used to predict future user behavior or recommend new items. The flexibility of the encoder network allows it to be tailored to a wide range of applications, each benefiting from the ability to extract meaningful embeddings from complex input data. Whether through the sequential processing capabilities of an RNN or the parallel processing power of a transformer, the encoder network serves as a powerful tool for transforming raw data into actionable insights.

The method, as described above, further may comprise the step of decoding the content from the latent space. This decoding process is accomplished using a decoder network. Each of these architectures offers unique advantages and can be selected based on the specific requirements of the application. For instance, an RNN-based decoder network can be employed to handle sequential data, where the temporal dependencies between elements are significant. This approach is particularly useful in applications like language translation or time-series prediction, where the order of words or data points is. In this setup, the RNN processes the latent space representation sequentially, generating output one step at a time. Alternatively, an LSTM network can be utilized to address the vanishing gradient problem often encountered in traditional RNNs. LSTMs are capable of learning long-term dependencies, making them suitable for tasks that require the retention of information over extended sequences. For example, in a text generation task, an LSTM-based decoder can effectively generate coherent and contextually relevant sentences by maintaining context over long passages. A GRU-based decoder network offers a simpler architecture compared to LSTMs, with fewer parameters, which can lead to faster training times. GRUs are effective in scenarios where computational efficiency is a priority, such as in real-time applications or when working with limited computational resources.

On the other hand, a transformer-based decoder network can be employed to leverage the self-attention mechanism, which allows for parallel processing of input data. This architecture is particularly advantageous in applications requiring high throughput and scalability, such as large-scale natural language processing tasks. The transformer model can efficiently handle long-range dependencies and capture complex relationships within the data, making it a powerful choice for decoding tasks. In addition to selecting the appropriate architecture, various techniques can be applied to enhance the performance of the decoder network. For example, attention mechanisms can be integrated into RNN, LSTM, or GRU-based decoders to improve their ability to focus on relevant parts of the input sequence during decoding. This can lead to more accurate and contextually aware outputs. Furthermore, the decoder network can be trained using different loss functions, such as cross-entropy loss for classification tasks or mean squared error for regression tasks. The choice of loss function can significantly impact the quality of the decoded output and should be aligned with the specific objectives of the application.

In terms of alternatives, the decoder network can be designed to operate in a multi-modal setting, where it decodes content from latent spaces derived from different types of data, such as text, images, or audio. This approach can enable the generation of rich, multi-faceted outputs that incorporate information from diverse sources. The method, as described above, involves a content approval machine learning model. The content approval machine learning model further may comprise a neural network. The neural network is configured to determine a score. This score identifies a degree of like or dislike by the content owner for the derivative work. The score is determined as a function of a text embedding. The text embedding identifies an item in the derivative work. The determination of the score utilizes the at least one processor. For instance, a CNN might be particularly effective for analyzing visual elements within the derivative work, extracting features from images or video frames that correlate with the content owner's preferences.

Alternatively, an RNN could be employed to process sequential data, such as audio or text, capturing temporal dependencies that might influence the content owner's degree of like or dislike. In one embodiment, the neural network could incorporate an attention mechanism, allowing it to focus on specific parts of the derivative work that are more relevant to the content owner's preferences. This could be particularly useful in complex works where certain elements carry more weight in the approval process. For example, in a video, the attention mechanism might prioritize scenes with specific visual motifs or audio cues that align with the content owner's past approvals. The text embedding, which serves as a pivotal input to the neural network, can be generated using various techniques such as word2vec, GloVe, or BERT. These embeddings transform textual elements of the derivative work into numerical vectors that encapsulate semantic meaning. For instance, if the derivative work includes a script or dialogue, the text embedding could capture nuances in language, tone, and context that are significant to the content owner. The score determination process might involve multiple layers of processing, where initial layers of the neural network extract basic features, and subsequent layers combine these features to form higher-level abstractions. This hierarchical approach allows the model to progressively refine its understanding of the derivative work, ultimately leading to a more accurate score.

In another embodiment, the model could be trained using a dataset that includes historical approval data from the content owner, allowing it to learn patterns and preferences over time. This training process might involve supervised learning, where the model is provided with labeled examples of approved and disapproved works, or unsupervised learning, where the model identifies patterns without explicit labels. The model's adaptability could be enhanced by incorporating feedback loops, where the content owner can provide real-time feedback on the model's scores, allowing for continuous refinement and personalization. This feedback could be collected through a user interface that presents the score alongside the derivative work, enabling the content owner to make adjustments as needed. Additionally, the model could be extended to support multi-modal inputs, where it simultaneously processes text, audio, and visual data from the derivative work. This would enable a more holistic assessment of the work, capturing the interplay between different media types that might influence the content owner's approval. In terms of alternatives, the neural network could be replaced or supplemented with other machine learning models, such as decision trees or support vector machines, depending on the specific requirements and constraints of the application. These models might offer advantages in terms of interpretability or computational efficiency, providing a different balance of trade-offs compared to neural networks.

The method, as described above, further may comprise the step of determining a text embedding. This text embedding is used to identify an item. The determination of this text embedding is performed using a CLIP model. The CLIP model, which stands for Contrastive Language Image Pre-training, is a versatile tool that can be adapted to different scenarios for identifying items within derivative works. One approach involves training the CLIP model on a diverse dataset that includes a wide range of text and image pairs. This training allows the model to learn associations between textual descriptions and visual elements, enabling it to generate text embeddings that accurately represent items in derivative works. For instance, if the derivative work is a digital artwork, the CLIP model can be used to generate text embeddings for various elements within the artwork, such as "sunset," "mountain," or "river," based on the visual content and associated textual descriptions.

An alternative approach could involve fine-tuning the CLIP model on a specific domain or context relevant to the content owner. For example, if the content owner specializes in fashion, the CLIP model can be fine-tuned using a dataset of fashion-related text and images. This fine-tuning process enhances the model's ability to generate text embeddings that are more aligned with the content owner's preferences and the specific items of interest within the fashion domain, such as "vintage dress," "leather boots," or "silk scarf." Additionally, the CLIP model can be configured to handle multi-modal inputs, where both text and image data are used simultaneously to generate a more comprehensive text embedding. This configuration allows the model to consider the context provided by both modalities, resulting in a richer and more nuanced representation of the item in the derivative work. For example, a derivative work that includes both textual descriptions and visual elements can be processed by the CLIP model to generate a text embedding that captures the essence of the item, such as "a serene landscape with a tranquil lake and towering pine trees." Moreover, the CLIP model can be integrated with other machine learning techniques to enhance its performance. For instance, a reinforcement learning algorithm can be employed to iteratively improve the text embedding generation process. By providing feedback on the accuracy and relevance of the generated embeddings, the reinforcement learning algorithm can guide the CLIP model to refine its understanding of the items in the derivative work, leading to more precise and contextually appropriate text embeddings. In terms of alternatives, the CLIP model can be replaced or supplemented with other models that specialize in text embedding generation. For example, a BERT-based model can be used to generate text embeddings that focus on the semantic meaning of the text, while a ResNet-based model can be employed to extract visual features from images. By combining the strengths of different models, a more robust and versatile text embedding generation process can be achieved, catering to a wide range of derivative works and content owner preferences.

The method, as described above, further may comprise the step of converting the requested theme to a text embedding. This conversion takes place in a shared latent space.

The conversion process utilizes the at least one processor. One approach involves employing a pre-trained language model, such as BERT or GPT, which can transform the theme into a high-dimensional vector representation. This vector captures semantic nuances and contextual relationships inherent in the theme, allowing for a more nuanced analysis by the neural network. For instance, if the requested theme is “vintage aesthetics,” the language model might generate a text embedding that encapsulates elements like “retro,” “nostalgia,” and “classic design.” This embedding can then be compared against embeddings of items in the derivative work to assess alignment with the theme. Alternatively, a custom-trained model could be developed specifically for the domain of interest. This model could be fine-tuned on a dataset of themes and corresponding text descriptions, enhancing its ability to generate embeddings that are particularly relevant to the content approval context. In another variation, the conversion process might involve a multi-step pipeline where the theme is first tokenized into individual words or phrases. Each token is then embedded separately, and these embeddings are aggregated using techniques such as averaging, concatenation, or attention mechanisms to form a comprehensive representation of the theme. Moreover, the shared latent space can be designed to accommodate embeddings from multiple modalities, such as text, images, and audio. This would enable the system to handle themes that are expressed in non-textual formats, broadening the scope of content that can be evaluated. In terms of alternatives, the conversion could also leverage a graph-based approach, where themes and items are represented as nodes in a graph. The relationships between nodes, such as co-occurrence or semantic similarity, could be used to derive embeddings that reflect the interconnectedness of concepts within the theme. Additionally, the shared latent space might be dynamically updated based on feedback from content owners, allowing the system to adapt to evolving preferences and trends. This could involve techniques like reinforcement learning, where the model iteratively refines its embeddings based on approval scores received from previous evaluations.

The method, as described above, further may comprise the step of transforming the predetermined content into a derivative work. This derivative work may comprise audio, video, or images. The transformation is based on an embedding for the requested theme. The transformation process utilizes the at least one processor. For instance, when transforming content into audio, one approach could involve using a text-to-speech engine that leverages the embedding for the requested theme to modulate the tone, pitch, and speed of the generated audio. This could result in a narration that aligns with the emotional or thematic context of the original content. Alternatively, the transformation could involve generating a musical composition where the embedding influences the choice of instruments, tempo, and melody to reflect the desired theme. In the case of video transformation, the process might involve using computer-generated imagery (CGI) to create animations or visual effects that are thematically consistent with the embedding. For example, if the theme is “futuristic,” the transformation could result in a video with sleek, metallic visuals and advanced technology motifs.

Another possibility is to apply filters or overlays to existing video footage, altering colors, lighting, and textures to match the theme. When it comes to images, the transformation could involve style transfer techniques, where the embedding guides the application of artistic styles to the original image. This might result in a painting-like rendition of a photograph, with brushstrokes and color palettes that reflect the theme. Alternatively, the transformation could involve compositing multiple images together, using the embedding to determine the arrangement and blending of elements to create a cohesive thematic image. In all these cases, the transformation process can be further refined by incorporating user feedback or preferences, allowing for iterative adjustments to better align the derivative work with the intended theme. Additionally, the transformation could be applied in real-time, enabling dynamic content creation that responds to changes in the embedding or user input.

Moreover, alternative approaches could involve using generative adversarial networks (GANs) to produce high-quality derivative works. In this scenario, the embedding could serve as a conditioning input to the generator network, guiding the creation of content that adheres to the thematic constraints. This method could be particularly effective for generating realistic images or videos that maintain a consistent style or mood. The method, as described above, further may comprise the step of embedding the digital watermark in the derivative work. This step involves the application of the digital watermark in a manner that integrates it into the derivative work. One method involves the use of frequency domain techniques, where the digital watermark is embedded by altering the frequency components of the derivative work. For instance, in an audio file, the watermark could be embedded by modifying the amplitude of certain frequency bands, ensuring that the watermark is imperceptible to the human car but detectable by specialized software. Alternatively, spatial domain techniques can be employed, particularly in image or video content. Here, the digital watermark is embedded by altering the pixel values in a subtle manner. For example, in an image, the least significant bits of certain pixels could be modified to encode the watermark. This method ensures that the visual quality of the image remains largely unaffected while embedding the watermark.

In another approach, a robust watermarking technique could be utilized, which is designed to withstand various transformations and manipulations of the derivative work. This could involve embedding the watermark in a way that it remains intact even if the work is compressed, resized, or subjected to other common editing processes. For instance, a robust watermark in a video might be embedded across multiple frames, ensuring its persistence even if individual frames are altered. For applications requiring a high level of security, an encrypted watermark could be used. This involves encrypting the watermark data before embedding it into the derivative work. The decryption key would then be required to extract and verify the watermark, adding an additional layer of protection against unauthorized access or tampering. In scenarios where the derivative work is expected to undergo frequent updates or modifications, a dynamic watermarking technique might be beneficial. This method allows the watermark to be updated or changed without the need to reprocess the entire work. For example, in a collaborative document, the watermark could be designed to reflect the most recent changes or the identity of the last editor. Furthermore, the digital watermark could be designed to carry additional metadata about the derivative work, such as the creation date, author information, or usage rights. This metadata could be encoded within the watermark itself, providing a means of tracking and managing the derivative work’s distribution and usage. In terms of alternatives, a visible watermark could be considered, where the watermark is intentionally made visible to serve as a deterrent against unauthorized use. This could be a logo or text overlay on an image or video, clearly indicating the ownership or intended use of the derivative work.

The method, as described above, further may comprise the frequency domain embedding of the digital watermark. One approach involves transforming the digital content into the frequency domain using a method such as the Discrete Fourier Transform (DFT) or the Discrete Cosine Transform (DCT). Once in the frequency domain, specific frequency components can be selected for embedding the digital watermark. This selection can be based on criteria such as robustness to compression or noise, or perceptual invisibility to the human eye. For instance, in an image, the mid-frequency range might be chosen for embedding the watermark, as it offers a balance between robustness and invisibility. The watermark itself could be a binary sequence or a more complex pattern, which is modulated onto the selected frequency components. This modulation can be achieved through techniques like spread spectrum, where the watermark is spread across multiple frequencies, or quantization index modulation, where the frequency components are quantized to embed the watermark. An alternative approach could involve using wavelet transforms, which provide a multi-resolution analysis of the content. In this case, the watermark could be embedded in the wavelet coefficients at different levels of decomposition, allowing for a more flexible and potentially more robust embedding process. The choice of wavelet basis functions and the level of decomposition can be tailored to the specific requirements of the content and the desired properties of the watermark. In another example, audio content could be transformed into the frequency domain using a Fast Fourier Transform (FFT). The watermark could then be embedded in the phase or magnitude of the frequency components. Embedding in the phase might offer better perceptual transparency, while embedding in the magnitude could provide greater robustness. Additionally, the embedding process can be adaptive, where the characteristics of the content are analyzed to determine the optimal embedding strategy. This could involve machine learning techniques to predict the best frequency components for embedding based on the content's features. Furthermore, the digital watermark can be designed to carry additional information, such as metadata about the content or the content owner. This information can be encoded within the watermark and extracted during the watermark detection process. In terms of alternatives, the digital watermark could be embedded in the spatial domain instead of the frequency domain, or a combination of both domains could be used to enhance the robustness and security of the watermark. The choice of domain and embedding technique can be influenced by factors such as the type of content, the expected types of attacks or distortions, and the computational resources available.

The method, as described above, further may comprise the step of updating the derivative work. The update involves the addition of a new digital watermark. This new digital watermark is characterized by its validity for a limited time. The method also may include the provision of access to the updated derivative work. One approach involves generating a unique digital watermark for each derivative work, which can be achieved by utilizing a random number generator or a hash function. This unique watermark can be embedded into the derivative work using techniques such as frequency domain embedding, where the watermark is inserted into the less perceptible parts of the content, or spatial domain embedding, where the watermark is directly inserted into the pixel values of an image or the audio samples of a sound file. The validity of the digital watermark for a limited time can be managed by associating a timestamp with the watermark. This timestamp can be checked against the current time to determine if the watermark is still valid. Alternatively, a countdown timer could be embedded within the watermark itself, which decrements over time and becomes invalid once it reaches zero. This approach ensures that the watermark is only valid for a predetermined duration, after which it can no longer be used to verify the authenticity of the derivative work. Access to the updated derivative work can be controlled through various mechanisms. For instance, a secure access token could be generated and distributed to authorized users, allowing them to view or download the updated work. This token could be time-sensitive, expiring after a certain period, or usage-based, allowing a limited number of accesses.

Another option is to implement a digital rights management (DRM) system that encrypts the derivative work and requires a decryption key for access. This key could be distributed to users who have been granted permission to access the content. In terms of alternatives, the digital watermark could be made dynamic, changing periodically to enhance security. This could involve altering the watermark's pattern or embedding method at regular intervals, making it more difficult for unauthorized users to replicate or remove. Additionally, the watermark could be linked to the content owner's preferences, such as incorporating specific symbols or codes that are meaningful to them, further personalizing the derivative work. Another alternative could involve using blockchain technology to record the watermarking process. Each time a new watermark is added, a transaction could be recorded on a blockchain, providing a transparent and immutable record of the watermark's creation and validity period. This could enhance trust and accountability in the content approval process.

The method, as described above, further may comprise the step of configuring a tracking system. The purpose of this tracking system is to determine the authenticity of the derivative work. The authenticity of the derivative work is verified as a function of the digital watermark. This verification process is carried out by the tracking system. One approach involves utilizing a distributed ledger technology, such as blockchain, to record and verify the digital watermark associated with each derivative work. This ledger can store metadata about the derivative work, including its creation date, creator information, and any modifications made over time. By comparing the digital watermark in the derivative work with the records on the ledger, the tracking system can verify its authenticity. Another alternative involves employing a machine learning algorithm specifically trained to recognize and validate digital watermarks. This algorithm could analyze the patterns and characteristics of the watermark embedded in the derivative work, comparing them against a database of known authentic watermarks. The algorithm could be designed to adapt and learn from new watermark patterns, improving its accuracy over time.

A further example could involve the use of a multi-factor authentication system. In this scenario, the tracking system might require additional verification steps, such as a digital signature from the content owner or a unique identifier linked to the creator's profile. This multi-layered approach could enhance the security and reliability of the authenticity verification process. Additionally, the tracking system could incorporate a real-time monitoring feature. This feature might continuously scan the internet for unauthorized copies of the derivative work, using the digital watermark as a key identifier. Upon detecting a potential infringement, the system could alert the content owner or take automated actions, such as issuing a takedown request or notifying the platform hosting the unauthorized content. In terms of alternatives, the tracking system could also be integrated with a content management system (CMS). This integration would allow for seamless tracking and management of derivative works within the CMS, providing content owners with a centralized platform to monitor authenticity and manage their digital assets. Moreover, the tracking system could offer a user-friendly interface, enabling content owners to easily upload their derivative works and receive instant feedback on authenticity verification. This interface might include visual indicators, such as color-coded authenticity status or detailed reports outlining the verification process and results.

The method, as described above, further may comprise the step of validating user requests for access to the derivative work. The validation of these user requests is authorized as a function of the digital watermark. One approach involves the use of a digital watermark, which can be embedded within the derivative work in a manner that is imperceptible to the user but detectable by the system. This digital watermark can contain metadata such as the creator's identity, the date of creation, and access permissions. For instance, when a user requests access to the derivative work, the system can extract the digital watermark and cross-reference the embedded metadata with a database of authorized users. This database can be dynamically updated to reflect changes in access permissions, such as when a content owner decides to grant or revoke access to certain users. The system can then determine whether the requesting user is authorized to access the work based on this comparison. In another example, the digital watermark can be used to track the distribution of the derivative work. Each time the work is accessed or shared, the system can log the event, including details such as the user's identity, the time of access, and the location. This information can be used to generate reports for the content owner, providing insights into how the derivative work is being used and by whom. Alternatively, the digital watermark can be designed to degrade or alter the quality of the derivative work if unauthorized access is detected. For example, if a user attempts to access the work without proper authorization, the system can trigger a mechanism that reduces the resolution of the work or overlays a visible watermark indicating unauthorized access. This serves as a deterrent to unauthorized distribution and use. In addition to these examples, the validation process can be enhanced by incorporating machine learning algorithms that analyze patterns of access requests. By training a model on historical access data, the system can predict and flag potentially unauthorized access attempts based on deviations from typical user behavior. This predictive capability can be used to preemptively deny access or require additional authentication steps for suspicious requests. Furthermore, the digital watermark can be combined with other security measures, such as encryption or biometric authentication, to create a multi-layered access control system. For instance, a user may be required to provide a fingerprint or facial recognition scan in addition to having their access request validated by the digital watermark. This combination of techniques can provide a robust framework for protecting the derivative work from unauthorized access.

The method, as described above, further may comprise the step of automatically requesting an automated payment. This request for payment is initiated via the execution of a smart contract. The execution of this smart contract is triggered based on the use of the derivative work. The detection of this use of the derivative work is determined as a function of the digital watermark. For instance, the smart contract could be programmed to interact with a blockchain network, where the digital watermark serves as a unique identifier for the derivative work. Upon detection of the watermark, the smart contract could automatically execute a transaction, transferring a predetermined amount of cryptocurrency from the user's digital wallet to the content owner's account. This approach ensures transparency and immutability, as all transactions are recorded on the blockchain.

Alternatively, the smart contract could be integrated with traditional banking systems, where the detection of the digital watermark triggers an API call to a financial institution. This API call could initiate a direct debit from the user's bank account, transferring funds to the content owner's account. This method might appeal to users who prefer dealing in fiat currency rather than cryptocurrency. In another variation, the smart contract could be designed to offer a tiered payment structure. For example, the payment amount could vary based on the frequency or duration of the derivative work's use. If the digital watermark is detected multiple times within a certain period, the smart contract could adjust the payment amount accordingly, offering discounts for bulk usage or higher fees for extended use. Moreover, the digital watermark itself could be dynamic, changing periodically to enhance security and prevent unauthorized use. This dynamic watermark could be linked to a time-based algorithm, ensuring that only the most current version of the derivative work is authorized for use. The smart contract would then verify the validity of the watermark before executing the payment request. Additionally, the smart contract could incorporate a feedback mechanism, where the content owner is notified of each transaction. This notification could include details such as the identity of the user, the nature of the derivative work, and the amount paid. This information could be used by the content owner to adjust their pricing strategy or to identify trends in the use of their content.

In terms of alternatives, the smart contract could be designed to support multiple payment methods, allowing users to choose between cryptocurrency, credit card payments, or direct bank transfers. This flexibility could enhance user experience and broaden the appeal of the system. Furthermore, the smart contract could be configured to handle disputes automatically. For instance, if a user believes they have been incorrectly charged, they could submit a claim through the smart contract. The contract could then temporarily hold the disputed funds in escrow while an automated arbitration process reviews the claim. This process could involve analyzing the digital watermark data and usage logs to determine the validity of the claim. The method, as described above, further may comprise the step of revoking access to the approved derivative work. This action is taken upon the determination that a time-sensitive watermark has expired. One approach involves embedding a digital watermark within the derivative work that contains metadata specifying an expiration date. This watermark can be a visible or invisible marker, depending on the nature of the content and the preferences of the content owner. For instance, in a video file, an invisible watermark might be embedded in the audio or video stream, which is detectable by specialized software. Once the expiration date is reached, the software can automatically trigger a script that restricts access to the file. This could involve encrypting the file, rendering it unreadable without a new decryption key, or moving the file to a secure location inaccessible to the user. Alternatively, in a text document, a visible watermark might be used, such as a timestamp or a digital signature that becomes invalid after a certain date. Upon expiration, the document could be programmed to display a message indicating that access has been revoked, or it could automatically delete itself from the user's device.

Another example could involve a cloud-based system where the derivative work is stored on a remote server. In this scenario, the server could monitor the expiration date embedded in the watermark and, upon reaching this date, automatically revoke user permissions to access the file. This could be achieved by altering the access control list associated with the file, effectively removing the user's ability to view or download the content. As an alternative, the watermark could be linked to a licensing agreement that specifies the terms of use, including the expiration date. Once the watermark indicates that the agreement has expired, the system could notify the user and provide options for renewing the license or purchasing additional access time. In some cases, the watermark might be dynamic, allowing for real-time updates to the expiration date based on user interactions or external factors. For example, if the user engages with the content in a specific way, such as sharing it on social media or providing feedback, the expiration date could be extended as a reward for their engagement. Furthermore, the watermark could be designed to interact with other systems, such as a digital rights management (DRM) platform, to ensure that access is revoked across all devices and platforms where the derivative work is available. This could involve synchronizing the expiration date with the DRM system, ensuring that the content is consistently protected regardless of how or where it is accessed.

In the Summary above and in this Detailed Description, and the Claims below, and in the accompanying drawings, reference is made to particular features of various implementations. It is to be understood that the disclosure of particular features of various implementations in this specification is to be interpreted to include all possible combinations of such particular features. For example, where a particular feature is disclosed in the context of a particular aspect or implementation, or a particular claim, that feature can also be used-to the extent possible—in combination with and/or in the context of other particular aspects and implementations, and in an implementation generally.

While multiple implementations are disclosed, still other implementations will become apparent to those skilled in the art from this detailed description. Disclosed implementations may be capable of myriad modifications in various obvious aspects, all without departing from the spirit and scope of the disclosed implementations. Accordingly, the drawings and descriptions are to be regarded as illustrative in nature and not restrictive.

It should be noted that the features illustrated in the drawings are not necessarily drawn to scale, and features of one implementation may be employed with other implementations as the skilled artisan would recognize, even if not explicitly stated herein. Descriptions of well-known components and processing techniques may be omitted so as to not unnecessarily obscure the implementation features.

In the present disclosure, various features may be described as being optional, for example, through the use of the verb "may;" or, through the use of any of the phrases: "in some implementations," "in some designs," "in various implementations," "in various designs," "in an illustrative example," or, "for example." For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be implemented in seven different ways, namely with just one of the three possible features, with any two of the three possible features or with all three of the three possible features.

In various implementations, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various implementations have been disclosed and described in detail herein, it will be apparent to those skilled in the art that various changes may be made to the disclosed configuration, operation, and form without departing from the spirit and scope thereof. In particular, it is noted that the respective implementation features, even those disclosed solely in combination with other implementation features, may be combined in any configuration excepting those readily apparent to the person skilled in the art as nonsensical. Likewise, use of the singular and plural is solely for the sake of illustration and is not to be interpreted as limiting.

The Abstract is provided to comply with 37 C. F. R. § 1.72 (b), to allow the reader to quickly ascertain the nature of the technical disclosure and is submitted with the understanding that it will not be used to interpret or limit the scope or meaning of the claims.

In the present disclosure, any method or apparatus implementation may be devoid of one or more process steps or components. In the present disclosure, implementations employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an implementation "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of implementation apparatus are known in the art. One or more implementation part may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described hereinabove may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, chemical, magnetic, electromagnetic, fluid, and thermal interaction. Two components may be functionally coupled to each other even though they are not in direct contact with each other. The terms "abutting" or "in mechanical union" refer to items that are in direct physical contact with each other, although the items may not necessarily be attached together.

The word "exemplary" is used herein to mean "serving as an example, instance, or illustration." Any implementation described herein as "exemplary" is not necessarily to be construed as preferred over other implementations. While various aspects of the disclosure are presented with reference to drawings, the drawings are not necessarily drawn to scale unless specifically indicated.

Reference throughout this specification to "an implementation" or "the implementation" means that a particular feature, structure, or characteristic described in connection with that implementation is included in at least one implementation. Thus, the quoted phrases, or variations thereof, as recited throughout this specification are not necessarily all referring to the same implementation.

Similarly, it should be appreciated that in the above description, various features are sometimes grouped together in a single implementation, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects may lie in a combination of fewer than all features of any single foregoing disclosed implementation. Thus, the claims following this Detailed Description are hereby expressly incorporated into this Detailed Description, with each claim standing on its own as a separate implementation. This disclosure is intended to be interpreted as including all permutations of the independent claims with their dependent claims.

A system or method implementation in accordance with the present disclosure may be accomplished through the use of one or more computing devices. As depicted, for example, at least in FIG. 1, FIG. 2, and FIG. 3, one of ordinary skill in the art would appreciate that an exemplary system appropriate for use with implementation in accordance with the present application may generally include one or more of a Central processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with implementations of the present disclosure include, but are not limited to, proprietary computing devices, personal computers, mobile computing devices, tablet PCs, mini-PCs, servers, or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and implementation of the present disclosure are contemplated for use with any computing device.

As used in this application, the terms "component," "environment," "system," "architecture," "interface," "unit," "module," "pipe," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device containing a processor circuit and the computing device may be a component. One or more components may reside within a process and/or thread of execution. A component may be localized on one computing device or distributed between two or more computing devices. As described herein, a component may execute from various computer-readable non-transitory media having various data structures stored thereon. Components may communicate via local and/or remote processes in accordance, for example, with one or more signals (for example, analog and/or digital) having one or more data packets (e.g., data from one component interacting with another component in a local system, distributed system, and/or across a network such as a wide area network with other systems via the signal). As another example, a component may be an apparatus with specific functionality provided by mechanical parts operated by electric or electronic circuitry that is controlled by a software application or firmware application executed by a processor circuit, wherein the processor may be internal or external to the apparatus and may execute at least a part of the software or firmware application. As another example, a component may be an apparatus that provides specific functionality through electronic components without mechanical parts, and the electronic components may include a processor therein to execute software or firmware that provides, at least in part, the functionality of the electronic components. In certain embodiments, components may communicate via local and/or remote processes in accordance, for example, with a signal having one or more data packets (e.g., data from one component interacting with another component in a local system, distributed system, and/or across a network such as a wide area network with other systems via the signal). In other embodiments, components may communicate or otherwise be coupled via thermal, mechanical, electrical, and/or electromechanical coupling mechanisms (such as conduits, connectors, combinations thereof, or the like). An interface may include input/output (I/O) components as well as associated processors, applications, and/or other programming components. The terms "component," "environment," "system," "architecture," "interface," "unit," "module," and "pipe" may be utilized interchangeably and may be referred to collectively as functional elements.

As utilized in this disclosure, the term "processor" may refer to any computing processing unit or device comprising single-core processors; single processors with software multithread execution capability; multi-core processors; multi-core processors with software multithread execution capability; multi-core processors with hardware multithread technology; parallel platforms; and parallel platforms with distributed shared memory. Additionally, a processor may refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor may be implemented as a combination of computing processing units. In certain embodiments, processors may utilize nanoscale architectures such as, but not limited to, molecular and quantum-dot based transistors, switches, and gates, to optimize space usage or enhance the performance of user equipment or other electronic equipment.

As used herein, a singular term may include multiple objects. As used herein, a single element may include multiple such elements. For example, the term "computer" may include a single computer or multiple computers. The phrase "a computer that stores data and runs software," may include a single computer that both stores data and runs software, a first computer that stores data and a second computer that runs software, or multiple computers that together store data and run software, where at least one of the multiple computers stores data and at least one of the multiple computers runs software. For example, the term "processor" may include a single processor or multiple processors. The phrase "a processor that stores data and runs software," may include a single processor that both stores data and runs software, a first processor that stores data and a second processor that runs software, or multiple processors that together store data and run software, where at least one of the multiple processors stores data and at least one of the multiple processors runs software. An implementation comprising multiple processors may configure each particular processor of the multiple processors to exclusively execute only a particular task assigned to that particular processor. An implementation comprising multiple processors may configure each particular processor of the multiple processors to execute any task of multiple tasks assigned to that particular processor by a scheduler such that a different task may be assigned to different processors at different times. As used herein in an apparatus or a computer-readable medium, "at least one" object rather than or in addition to a single object may perform the claimed operations. For example, "a computer-readable medium" may be construed as "at least one computer-readable medium," and "an apparatus comprising a processor and a memory" may be construed as "a system comprising processing circuitry and a memory subsystem," or "a system comprising processing circuitry and memory" (where memory lacks the article 'a'). It should be noted that a skilled person would understand that "processing circuitry" may include a single processor or multiple processors. Similarly "memory subsystem" or "memory" (lacking an article) may include a single memory unit or multiple memory units.

In addition, in the present specification and annexed drawings, terms such as "store," "storage," "data store," "data storage," "memory," "repository," and substantially any other information storage component relevant to the operation and functionality of a component of the disclosure, refer to "memory components," entities embodied in a "memory," or components forming the memory. It may be appreciated that the memory components or memories described herein embody or comprise non-transitory computer storage media that may be readable or otherwise accessible by a computing device. Such media may be implemented in any methods or technology for storage of information such as computer-readable instructions, information structures, program modules, or other information objects. The memory components or memories may be either volatile memory or non-volatile memory, or may include both volatile and non-volatile memory. In addition, the memory components or memories may be removable or non-removable, and/or internal or external to a computing device or component. Examples of various types of non-transitory storage media may include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory medium suitable to retain the desired information and which may be accessed by a computing device.

In various implementations, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with implementations of the present disclosure, and implementations of the present disclosure are contemplated for use with any appropriate configuration.

According to an implementation of the present disclosure, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth® connections, or any combination thereof. One of ordinary skill in the art would appreciate that there are numerous communications means that may be utilized with implementations of the present disclosure, and implementations of the present disclosure are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on-any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an implementation may include an alternate order of the steps adapted to a particular application of a technique disclosed herein. All such variations and modifications are intended to fall within the scope of this disclosure. The depiction and description of steps in any particular order is not intended to exclude implementations having the steps in a different order, unless required by a particular application, explicitly stated, or otherwise clear from the context.

Traditionally, a computer program consists of a sequence of computational instructions or program instructions. It will be appreciated that a programmable apparatus (that is, computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable, and replaceable, or fixed. It will also be understood that a computer can include a Basic Input/Output System (BIOS), firmware, an operating system, a database, or the like that can include, interface with, or support the software and hardware described herein.

Implementations of the system as described herein are not limited to applications involving conventional computer programs or programmable apparatuses that run them. It is contemplated, for example, that implementations of the disclosure as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, implementations that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, implementations of the disclosure are not described with reference to any particular programming language. It is appreciated that a variety of programming languages may be used to implement the present teachings as described herein, and any references to specific languages are provided for disclosure of enablement and best mode of implementations of the disclosure. Implementations of the disclosure are well suited to a wide variety of computer network systems over numerous topologies. Within this field, the configuration and management of large networks include storage devices and computers that are communicatively coupled to dissimilar computers and storage devices over a network, such as the Internet.

The element descriptions and their respective reference characters used in the Drawings are summarized as follows.

scenario 100
user 105
content derivation platform 110
network cloud 115
predetermined content 120
derivative work 125
requested theme 130
prompt system 135
authorization server 140
watermark 145
mobile application 150
mobile device 155
predetermined content server 160
derivative work server 165
processor 200
memory 205
program memory 210
data memory 215
derivative work generation and augmentation engine (DWGAE) 220
storage medium 225
input/output (I/O) interface 230
user interface 235
multimedia interface 240
forward diffusion process 245
reverse diffusion process 250
diffusion training data 255
encoder networks 260
decoder networks 265
diffusion models 270
content approval models 275
requested theme 280
pipeline 400
content stream 405
stream splitter 410
audio stream 415
image stream 420
text stream 425
input high-dimensional space 430
audio encoder 435
image encoder 440
text encoder 445
latent space 450
audio diffusion model 455
image diffusion model 460
text diffusion model 465
audio decoder 470
image decoder 475
text decoder 480
output high dimensional space 485
process 500
process 600
process 700

A number of implementations have been described. Nevertheless, it will be understood that various modifications may be made. For example, the steps of the disclosed techniques may be performed in a different sequence, components of the disclosed systems may be combined in a different manner, or the components may be supplemented with other components. Accordingly, other implementations are contemplated, within the scope of the following claims.

What is claimed is:

1. A method comprising: receiving predetermined content, using a database server; receiving a request to transform the predetermined content into a derivative work, using a content derivation platform comprising at least one processor; receiving a requested theme for the derivative work, using the at least one processor; creating the derivative work generated as a function of the predetermined content and the requested theme, using generative artificial intelligence and the at least one processor, wherein the creating further comprises transforming the predetermined content into the derivative work comprising audio, video or images, based on an embedding for the requested theme, using the at least one processor; determining if the generated derivative work is approved based on a content approval machine learning model configured to determine a content approval score as a function of at least one content owner preference and the generated derivative work, using the at least one processor; wherein the content approval machine learning model further comprises a neural network configured to determine a score identifying a degree of like or dislike by the content owner for the derivative work, the score determined as a function of a text embedding identifying an item in the derivative work, using the at least one processor; and in response to determining the content approval score is greater than a predetermined minimum: applying a digital watermark to the approved derivative work, using the at least one processor; configuring an authorization server to govern use of the approved derivative work based on the digital watermark, using the at least one processor; and providing access to the approved derivative work.

2. The method of claim 1, wherein the content comprises music.

3. The method of claim 1, wherein the content comprises audio.

4. The method of claim 3, wherein the audio further comprises a human voice sound.

5. The method of claim 4, wherein the method further comprises detecting the human voice based on a technique comprising autocorrelation, using the at least one processor.

6. The method of claim 5, wherein the autocorrelation further comprises frequency domain autocorrelation, using the at least one processor.

7. The method of claim 3, wherein the audio further comprises a musical instrument sound.

8. The method of claim 1, wherein the requested theme is determined based on an interview with a user, using the at least one processor.

9. The method of claim 8, wherein the interview with the user is performed by a chatbot, using the at least one processor.

10. The method of claim 8, wherein the requested theme is determined based on matching a response from the user with a semantically similar predetermined theme identified by a Large Language Model (LLM) as a function of the response from the user, using the at least one processor.

11. The method of claim 10, wherein the predetermined theme is pre-approved by the content owner.

12. The method of claim 1, wherein the generative artificial intelligence comprises a diffusion model.

13. The method of claim 12, wherein the diffusion model is a latent diffusion model.

14. The method of claim 12, wherein the method further comprises encoding the content to a latent space, using a encoder network.

15. The method of claim 14, wherein the encoder network further comprises a convolutional neural network (CNN) configured to extract mel-frequency cepstral coefficients (MFCCs) from the content.

16. The method of claim 14, wherein the encoder network further comprises a CNN configured to extract a spatial or temporal feature from the content.

17. The method of claim 14, wherein the encoder network further comprises a recurrent neural network (RNN) or a transformer, configured to extract a word embedding from the content.

18. The method of claim 14, wherein the method further comprises decoding the content from the latent space, using a decoder network.

19. The method of claim 1, wherein the method further comprises determining a text embedding identifying an item, using a CLIP model.

20. The method of claim 1, wherein the method further comprises converting the requested theme to a text embedding in a shared latent space, using the at least one processor.

21. The method of claim 1, wherein applying the digital watermark further comprises embedding the digital watermark in the derivative work.

22. The method of claim 21, wherein the method further comprises frequency domain embedding of the digital watermark.

23. The method of claim 1, wherein the method further comprises updating the derivative work with a new digital watermark that is valid for a limited time and providing access to the updated derivative work.

24. The method of claim 1, wherein governing use of the approved derivative work further comprises configuring a tracking system to determine authenticity of the derivative work, verified as a function of the digital watermark by the tracking system.

25. The method of claim 1, wherein governing use of the approved derivative work further comprises validating user requests for access to the derivative work authorized as a function of the digital watermark.

26. The method of claim 1, wherein governing use of the approved derivative work further comprises automatically request an automated payment via a smart contract execution triggered based on use of the derivative work detected as a function of the digital watermark.

27. The method of claim 1, wherein governing use of the approved derivative work further comprises revoke access to the derivative work upon determining a time-sensitive watermark has expired.

28. An article of manufacture comprising: a memory that is not a transitory propagating signal, wherein the memory further comprises computer readable instructions configured that when executed by at least one processor the computer readable instructions cause the at least one processor to perform operations comprising: receive predetermined content; receive a request to transform the predetermined content into a derivative work; receive a requested theme for the derivative work; create the derivative work generated as a function of the predetermined content and the requested theme, using generative artificial intelligence, wherein the predetermined content is transformed into the derivative work comprising audio, video or images, based on an embedding for the requested theme, using the at least one processor; determine if the generated derivative work is approved based on a content approval machine learning model configured to determine a content approval score as a function of a content owner preference and the generated derivative work; wherein the content approval machine learning model further comprises a neural network configured to determine a score identifying a degree of like or dislike by the content owner for the derivative work, the score determined as a function of a text embedding identifying an item in the derivative work, using the at least one processor; and in response to determining the content approval score is greater than a predetermined minimum: apply a digital watermark to the approved derivative work; configure an authorization server to govern use of the approved derivative work based on the digital watermark; and provide access to the approved derivative work.

* * * * *